United States Patent
Pradeep et al.

(10) Patent No.: US 10,839,705 B2
(45) Date of Patent: Nov. 17, 2020

(54) INTELLIGENT INFANT MONITORING SYSTEM AND INFANT MONITORING HUB AND INFANT LEARNING RECEPTIVITY DETECTION SYSTEM

(71) Applicant: Smilables Inc., Berkeley, CA (US)

(72) Inventors: Anantha Pradeep, Berkeley, CA (US); Ratnakar Dev, Berkeley, CA (US); Thomas Robbins, Berkeley, CA (US)

( * ) Notice: Subject to any disclaimer, the term of this patent is extended or adjusted under 35 U.S.C. 154(b) by 0 days.

(21) Appl. No.: 15/564,602

(22) PCT Filed: Apr. 5, 2016

(86) PCT No.: PCT/US2016/026062
§ 371 (c)(1),
(2) Date: Oct. 5, 2017

(87) PCT Pub. No.: WO2016/164374
PCT Pub. Date: Oct. 13, 2016

(65) Prior Publication Data
US 2018/0096614 A1    Apr. 5, 2018

Related U.S. Application Data

(63) Continuation of application No. 14/681,902, filed on Apr. 8, 2015, now abandoned, which is a continuation
(Continued)

(51) Int. Cl.
*G09B 5/00* (2006.01)
*G09B 5/02* (2006.01)

(52) U.S. Cl.
CPC ..................... *G09B 5/02* (2013.01)

(58) Field of Classification Search
CPC ............... G09B 5/00; G09B 5/02; G09B 5/08
See application file for complete search history.

(56) References Cited

U.S. PATENT DOCUMENTS 5,260,869 A * 11/1993 Ferrier ............... A63F 3/00643
128/905
6,517,351 B2 * 2/2003 Spector ............... G09B 17/006
434/169
(Continued)

FOREIGN PATENT DOCUMENTS

WO    2012158987 A2    11/2012

OTHER PUBLICATIONS

"International Application Serial No. PCT/US2016/026062, Search Report and Written Opinion dated Sep. 19, 2016", 11 pgs.
(Continued)

*Primary Examiner* — Peter R Egloff
(74) *Attorney, Agent, or Firm* — Kwan & Olynick LLP

(57) ABSTRACT

Provided are mechanisms and processes for more effectively monitoring infants to enhance caregiving and infant development. A system may include a wearable infant monitoring device, transmission interface, and monitoring hub. The wearable infant monitoring device includes sensors that detect activity and position of an infant. The transmission interface transmits measurement data associated with the activity and position of the infant. The monitoring hub receives the measurement data and includes a processor configured to determine the infant's receptivity to learning. Learning materials are then provided to a caregiver through a display interface based on the infant's receptivity to learning.

20 Claims, 17 Drawing Sheets

Related U.S. Application Data of application No. 14/679,006, filed on Apr. 5, 2015, now abandoned, which is a continuation of application No. 14/679,008, filed on Apr. 5, 2015, now abandoned, application No. 15/564,602, which is a continuation of application No. 14/681,904, filed on Apr. 8, 2015, now abandoned, and a continuation of application No. 14/681,906, filed on Apr. 8, 2015, now Pat. No. 10,223,497, which is a continuation of application No. 14/679,010, filed on Apr. 5, 2015, now abandoned.

(56) References Cited

U.S. PATENT DOCUMENTS

| | | | | |
|---|---|---|---|---|
| 9,028,405 | B2* | 5/2015 | Tran | A61B 5/0022 600/300 |
| 2008/0187893 | A1* | 8/2008 | Blaustein | G09B 7/02 434/236 |
| 2009/0156955 | A1 | 6/2009 | Jung et al. | |
| 2009/0226861 | A1* | 9/2009 | Thieberger Ben-Haom | G09B 5/04 434/167 |
| 2010/0030122 | A1 | 2/2010 | Gaspard | |
| 2010/0241018 | A1 | 9/2010 | Vogel | |
| 2011/0242486 | A1* | 10/2011 | Ebisawa | G06F 3/013 351/206 |
| 2015/0154445 | A1* | 6/2015 | Biswas | G06K 9/00604 345/2.3 |
| 2015/0325132 | A1* | 11/2015 | Garza Sada | G09B 7/00 434/169 |
| 2016/0012048 | A1* | 1/2016 | Yellin | G06F 16/435 707/722 |

OTHER PUBLICATIONS

"Int'l Application Serial No. PCT/US2016/026062, Preliminary Report on Patentability dated Oct. 19, 2017", 8 pgs.

* cited by examiner

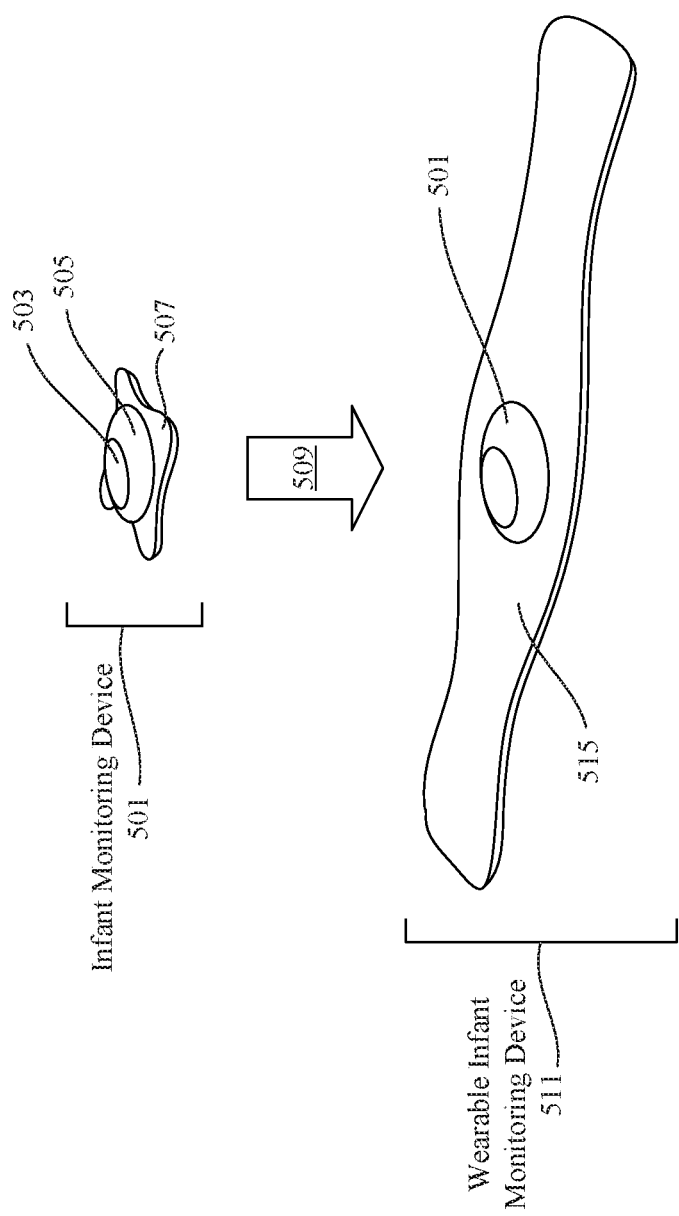

INTELLIGENT INFANT MONITORING SYSTEM AND INFANT MONITORING HUB AND INFANT LEARNING RECEPTIVITY DETECTION SYSTEM

CROSS-REFERENCE TO RELATED APPLICATIONS

This application is a U.S. national application under 35 U.S.C. 371 of PCT Application no. PCT/US2016/026062 (SMLBP002WO), entitled "INTELLIGENT INFANT MONITORING SYSTEM AND INFANT MONITORING HUB AND INFANT LEARNING RECEPTIVITY DETECTION SYSTEM," filed Apr. 5, 2016, by Pradeep, which is a continuation of and claims priority under 35 U.S.C. § 120 to abandoned U.S. patent application Ser. No. 14/681,902 (SMLBP002C1), entitled "INTELLIGENT INFANT MONITORING SYSTEM," filed Apr. 8, 2015, by Pradeep, which is a continuation of abandoned U.S. patent application Ser. No. 14/679,006 (SMLBP002), entitled "INTELLIGENT INFANT MONITORING SYSTEM," filed Apr. 5, 2015. PCT Application no. PCT/US2016/026062 is a continuation of and claims priority under 35 U.S.C. § 120 to abandoned U.S. patent application Ser. No. 14/681,904 (SMLBP003C1), entitled "INFANT MONITORING HUB," filed Apr. 8, 2015, by Pradeep, which is a continuation of abandoned U.S. patent application Ser. No. 14/679,008 (SMLBP003), entitled "INFANT MONITORING HUB," filed Apr. 5, 2015. PCT Application no. PCT/US2016/026062 is a continuation of and claims priority under 35 U.S.C. § 120 to U.S. patent application Ser. No. 14/681,906 (SMLBP004C1), entitled "INFANT LEARNING RECEPTIVITY DETECTION SYSTEM," filed Apr. 8, 2015, by Pradeep, which is a continuation of abandoned U.S. patent application Ser. No. 14/679,010 (SMLBP004), entitled "INFANT LEARNING RECEPTIVITY DETECTION SYSTEM," filed Apr. 5, 2015, each of which are incorporated by reference in their entirety and for all purposes.

TECHNICAL FIELD

The present disclosure relates to infant monitoring devices.

In one example, the present invention relates to mechanisms for providing an Intelligent Infant Monitoring System.

In one example, the present invention relates to mechanisms for providing a wearable infant monitoring device.

Background Art

Conventional infant monitoring systems include audio or visual monitors that remotely collect aural or visual information and transmit this information to another device that allows a caregiver, such as a parent, to view or hear the information. For instance, a microphone may be placed in proximity to the infant, such as on a night stand or table, and a remote speaker may be placed in proximity to a caregiver in another location such as another room. This allows the caregiver to hear the infant's cries, etc. Some monitoring systems include a video camera that is positioned to record movement and position of an infant. A caregiver can view the video of the infant from a remote device, such as a dedicated monitoring device or a smart phone.

Although conventional systems allow caregivers to monitor sounds and video of an infant from a remote device, these monitoring systems are limited to providing only rudimentary monitoring of an infant. Essentially, the monitoring systems allow a caregiver to hear and see the infant from a different location, such as from another room within a home. A caregiver must guess from the sounds and sights transmitted through the monitoring system about the infant's needs, mood, health, and well-being. Some wearable devices provide rudimentary heart rate and temperature information about an infant to a caregiver. However, current monitoring systems are extremely limited in nature. Caregivers can greatly benefit from a more robust monitoring system to improve the care and development of their infants.

SUMMARY OF INVENTION

Solution to Problem

Provided are mechanisms and processes for more effectively monitoring infants to enhance caregiving and infant development. A system may include a wearable infant monitoring device, transmission interface, and monitoring hub. The wearable infant monitoring device includes sensors that detect activity and position of an infant. The transmission interface transmits measurement data associated with the activity and position of the infant. The monitoring hub receives the measurement data and includes a processor configured to determine the infant's receptivity to learning. Learning materials are then provided to a caregiver through a display interface based on the infant's receptivity to learning.

Provided are mechanisms and processes for more effectively monitoring infants to enhance caregiving and infant development using an infant monitoring hub. The infant monitoring hub may include an infant monitoring device interface, a processor, persistent storage, and a platform interface. The infant monitoring device receives wirelessly transmitted measurement data from the infant monitoring device, which includes sensors that track infant activity and position. The processor processes the measurement data and selects and customizes learning materials for an infant associated with the infant monitoring device. The persistent storage stores learning materials provided by a remote platform that receives information from a plurality of infant monitoring hubs. The platform interface facilitates the exchange of information with the remote platform, which analyzes measurement data to identify a plurality of windows of receptivity and corresponding learning materials.

Provided are mechanisms and processes for more effectively monitoring infants to enhance caregiving and infant development. A system may include an infant monitoring device and a monitoring hub. The infant monitoring device includes sensors that gather measurement data. The monitoring hub receives the measurement data and analyzes the measurement data in relation to a learning receptivity model obtained from a remote platform. The measurement data is analyzed to predict a time and duration when an infant associated with the infant monitoring device will be receptive to leaning.

(Aspect 1)

A system comprising:

a wearable infant monitoring device, the wearable infant monitoring device including a plurality of sensors configured to detect activity and position of an infant;

a transmission interface configured to transmit measurement data associated with the activity and position of the infant; and a monitoring hub configured to receive measurement data, the monitoring hub including a processor configured to determine the infant's receptivity to learning, wherein learning materials are provided to a caregiver through a display interface based on the infant's receptivity to learning.
(Aspect 2)
The system as defined in aspect 1, wherein the processor determines the infant's receptivity to learning based on smile and gaze duration.
(Aspect 3)
The system as defined in aspect 1, wherein the processor determines the infants receptivity to leaning based on smile and gaze intensity.
(Aspect 4)
The system as defined in aspect 1, wherein the processor processes the data measurements and customizes learning content based on a developmental age associated with the infant.
(Aspect 5)
The system as defined in aspect 1, wherein the monitoring hub further comprises persistent storage configured to store learning content and schedules.
(Aspect 6)
The system as defined in aspect 1, wherein the monitoring hub further comprises persistent storage configured to store infant models and charts.
(Aspect 7)
The system as defined in aspect 1, wherein the monitoring hub further comprises a platform interface configured to facilitate communication between the monitoring hub and a platform, wherein the platform aggregates data from a plurality of infant monitoring devices.
(Aspect 8)
The system as defined in aspect 1, further comprising a peripheral device.
(Aspect 9)
The system as defined in aspect 8, wherein the peripheral device is a camera.
(Aspect 10)
The system as defined in aspect 9, wherein the peripheral device is an audio sensor.
(Aspect 11)
The system as defined in aspect 9, wherein the peripheral device is a projector.
(Aspect 12)
The system as defined in aspect 9, wherein the peripheral device is a tablet device.
(Aspect 13)
The system as defined in aspect 1, wherein the remote infant monitoring hub is a mobile device.
(Aspect 14)
The system as defined in aspect 1, wherein the plurality of sensors includes a tri-axial accelerometer, galvanic skin response (GSR) detector, a gyroscope, and a temperature sensor.
(Aspect 15)
The system as defined in aspect 1, wherein the transmission interface is a Bluetooth low energy (BLE) interface.
(Aspect 16)
A device comprising:
  a wearable infant monitoring device, the wearable infant monitoring device including a plurality of sensors configured to detect activity and position of an infant;
  a transmission interface configured to transmit measurement data associated with the activity and position of the infant; and
    a charging interface;
  wherein a monitoring hub is configured to receive measurement data from the wearable monitoring device, the monitoring hub including a processor configured to determine the infant's receptivity to learning, wherein learning materials are provided to a caregiver through a display interface based on the infant's receptivity to learning.
(Aspect 17)
The device as defined in aspect 16, wherein the processor determines the infant's receptivity to learning based on smile and gaze duration.
(Aspect 18)
The device as defined in aspect 16, wherein the processor determines the infant's receptivity to learning based on smile and gaze intensity.
(Aspect 19)
The device as defined in aspect 16, wherein the processor processes the data measurements and customizes learning content based on a developmental age associated with the infant.
(Aspect 20)
The device as defined in aspect 16, wherein the monitoring hub further comprises persistent storage configured to store learning content and schedules.
(Aspect 21)
An infant monitoring hub comprising:
  an infant monitoring device interface configured to receive wirelessly transmitted measurement data from an infant monitoring device, the infant monitoring device comprising a plurality of sensors configured to track infant activity and position;
  a processor configured to process the measurement data and select and customize learning materials for an infant associated with the infant monitoring device;
  persistent storage configured to store learning materials provided by a remote platform, the remote platform configured to receive information from a plurality of infant monitoring hubs associated with a plurality of infants; and
  a platform interface configured to exchange information with the remote platform, wherein the remote platform is configured to analyze measurement data to identify a plurality of windows of receptivity associated with the plurality of infants and learning materials appropriate for the plurality of windows of receptivity.
(Aspect 22)
The infant monitoring hub as defined in aspect 21, further comprising a display configured to allow a caregiver to interact with the device.
(Aspect 23)
The infant monitoring hub as defined in aspect 21, wherein the measurement data includes motion, temperature, and position.
(Aspect 24)
The infant monitoring hub as defined in aspect 21, wherein the platform identifies the plurality of windows of receptivity using data from one or more of an intentionality detector, gaze detector, shared attention detector, and cognition detector.
(Aspect 25)
The infant monitoring hub as defined in aspect 21, wherein the measurement data includes whether the infant is in a prone or supine position.
(Aspect 26)
The infant monitoring hub as defined in aspect 21, wherein the measurement data includes galvanic skin response.
(Aspect 27)
The infant monitoring hub as defined in aspect 21, wherein the processor is configured to process the measurement data into an observation about the infant.

(Aspect 28)

The infant monitoring hub as defined in aspect 27, wherein the observation includes the infant's state of sleep, mobility, stress, position, comfort, health, vigilance, or articulation.

(Aspect 29)

The infant monitoring hub as defined in aspect 21, wherein the processor is configured to process the measurement data into an inference about the infant.

(Aspect 30)

The infant monitoring hub as defined in aspect 29, wherein the inference includes the infants receptivity to learning, infant well-being, presence of caregiver, environmental factors, safety of the infant, or emotional state of the infant.

(Aspect 31)

The infant monitoring hub as defined in aspect 21, wherein the processor is further configured to customize the learning materials for the particular infant.

(Aspect 32)

The infant monitoring hub as defined in aspect 21, wherein the persistent storage is further configured to store schedules, models, and charts received from the platform.

(Aspect 33)

The infant monitoring hub as defined in aspect 21, further comprising a peripheral device.

(Aspect 34)

The infant monitoring hub as defined in aspect 21, wherein the peripheral device is a camera, microphone, or a projector.

(Aspect 35)

A system comprising:

an interface configured to receive wirelessly transmitted measurement data from an infant monitoring device, the infant monitoring device comprising a plurality of sensors configured to track infant activity and position;

a processor configured to process the measurement data;

persistent storage configured to store learning materials provided by a remote platform, the remote platform configured to receive information from a plurality of infant monitoring hubs associated with a plurality of infants; and a remote platform interface configured to exchange information with the remote platform, wherein the remote platform is configured to analyze measurement data to identify a plurality of windows of receptivity associated with the plurality of infants and learning materials appropriate for the plurality of windows of receptivity.

(Aspect 36)

The system as defined in aspect 35, wherein the measurement data includes whether the infant is in a prone or supine position.

(Aspect 37)

The infant monitoring hub as defined in aspect 35, wherein the processor is configured to process the measurement data into an observation about the infant.

(Aspect 38)

The infant monitoring hub as defined in aspect 37, wherein the observation includes the infant's state of sleep, mobility, stress, position, comfort, health, vigilance, or articulation.

(Aspect 39)

The infant monitoring hub as defined in aspect 35, wherein the processor is configured to process the measurement data into an inference about the infant.

(Aspect 40)

The infant monitoring hub as defined in aspect 39, wherein the inference includes the infant's receptivity to learning, infant well-being, presence of caregiver, environmental factors, safety of the infant, or emotional state of the infant.

(Aspect 41)

A system comprising:

an infant monitoring device associated with a plurality of sensors configured to obtain measurement data;

a monitoring hub configured to receive measurement data from the plurality of sensors and analyze the measurement data in relation to a learning receptivity model obtained from a remote platform, the remote platform configured to receive information from a plurality of monitoring hubs associated with a plurality of infant monitoring devices;

wherein the measurement data is analyzed to predict a time and duration when an infant associated with the infant monitoring device will be receptive to leaning.

(Aspect 42)

The system as defined in aspect 41, wherein the measurement data comprises infant gaze intensity and duration.

(Aspect 43)

The system as defined in aspect 41, wherein the measurement data comprises infant position and movement.

(Aspect 44)

The system as defined in aspect 41, wherein learning content is customized to a developmental age associated with the infant.

(Aspect 45)

The system as defined in aspect 41, wherein a developmental age associated with the infant is determined based on the measurement data.

(Aspect 46)

The method as defined in aspect 41, wherein the measurement data includes motion, temperature, position, and galvanic skin response.

(Aspect 47)

A method comprising:

receiving measurement data at a monitoring hub, the measurement data obtained from a plurality of sensors associated with an infant monitoring device;

analyzing the measurement data in relation to a leaning receptivity model obtained from a remote platform, the remote platform configured to receive information from a plurality of monitoring hubs associated with a plurality of infant monitoring devices; and predicting a time and duration when an infant associated with the infant monitoring device will be receptive to learning.

(Aspect 48)

The method as defined in aspect 47, wherein the measurement data comprises infant gaze intensity and duration.

(Aspect 49)

The method as defined in aspect 47, wherein the measurement data comprises infant position and movement.

(Aspect 50)

The method as defined in aspect 47, further comprising presenting learning content customized to a developmental age associated with the infant.

(Aspect 51)

The method as defined in aspect 47, further comprising determining a developmental age associated with the infant based on the measurement data.

(Aspect 52)

The method as defined in aspect 51, wherein predicting a time and duration is based on the developmental age associated with the infant.

(Aspect 53)

The method as defined in aspect 47, wherein the measurement data includes motion, temperature, position, and galvanic skin response.

(Aspect 54)

The method as defined in aspect 47, wherein analyzing the measurement data comprises processing the data measurement into an observation about the infant and comparing the observation to the learning receptivity model.

(Aspect 55)

The method as defined in aspect 47, wherein the observation includes one of sleep, mobility, stress, position, comfort, health, vigilance, or articulation.

(Aspect 56)

The method as defined in aspect 47, wherein analyzing the measurement comprises processing the data measurement into an inference about the infant and comparing the inference to the learning receptivity model.

(Aspect 57)

The method as defined in aspect 56, wherein the inference includes one of receptivity to learning, infant well-being, presence of caregiver, environmental factors, safety of infant, or emotional state of infant.

(Aspect 58)

The method as defined in aspect 57, wherein customizing learning content for the infant includes preparing informational material for a caregiver associated with the infant.

(Aspect 59)

The method as defined in aspect 58, wherein customizing learning content for the infant includes preparing suggestions for a caregiver associated with the infant.

(Aspect 60)

The method as defined in aspect 47, further comprising presenting learning content customized based on previous learning associated with the infant.

These and other embodiments are described further below with reference to the figures.

BRIEF DESCRIPTION OF DRAWINGS

FIG. 5A is a diagrammatic representation of one example of an infant monitoring device and a wearable infant monitoring device.

DESCRIPTION OF EMBODIMENTS

Figure 1:
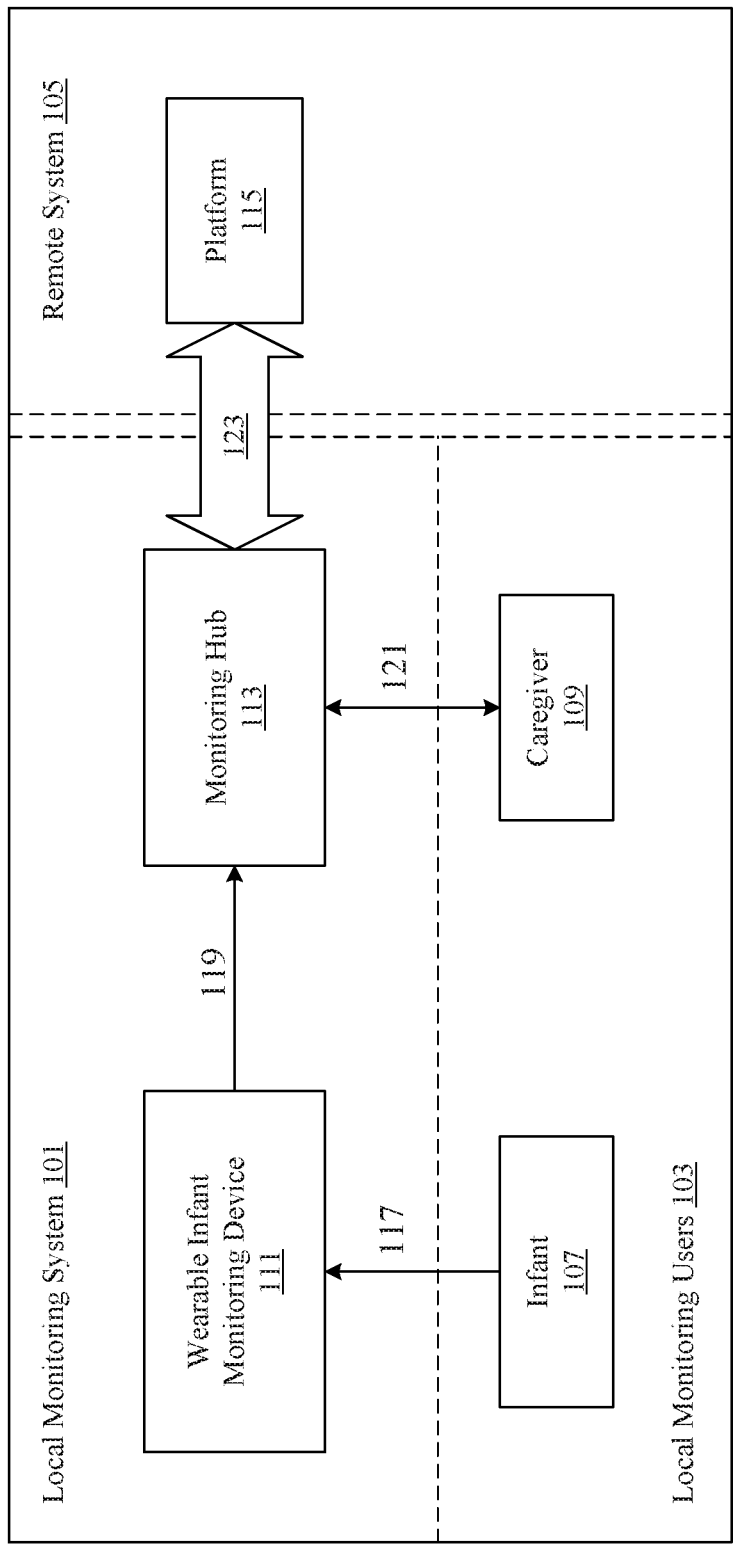
FIG. 1 is a diagrammatic representation of one example of an infant monitoring system.

Reference will now be made in detail to some specific examples of the invention in order to provide a thorough understanding of the presented concepts. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various techniques and mechanisms of the present invention will sometimes be described in singular form for clarity. However, it should be noted that some embodiments include multiple iterations of a technique or multiple instantiations of a mechanism unless noted otherwise. Furthermore, the techniques and mechanisms of the present invention will sometimes describe two entities as being connected. It should be noted that a connection between two entities does not necessarily mean a direct, unimpeded connection, as a variety of other entities may reside between the two entities. Consequently, a connection does not necessarily mean a direct, unimpeded connection unless otherwise noted.

Conventional systems for infant monitoring typically allow caregivers to monitor audio and/or video of an infant from a remote device such as a speaker or portable device. However, these monitoring systems are limited to providing only rudimentary monitoring of an infant. Essentially, the monitoring systems allow a caregiver to hear and see the infant from a different location, such as from another room within a home. A caregiver must guess from the sounds and sights transmitted through the monitoring system about the infant's needs, mood, health, and well-being. Once the caregiver goes to the infant, the monitoring system is no longer useful.

Some wearable devices provide rudimentary heart rate or temperature information about an infant to a caregiver. However, all of these current monitoring systems are extremely limited in nature. Caregivers can greatly benefit from a more robust monitoring system to improve the care and development of their infants.

Various embodiments of the present disclosure relate to providing an infant monitoring device that is wearable by an infant. For instance, a wearable infant monitoring device can gather various measurements associated with the infant, such as motion, temperature, position, arousal, etc. These measurements can be transmitted to a monitoring hub that can process the data into useful information that can be provided to one or more caregivers. In some examples, environmental sensors can collect additional measurement data, such as audio levels and video data, which can also be transmitted to the monitoring hub. In some embodiments, the monitoring hub may interact with remote servers configured to aggregate information from multiple wearable infant monitoring devices in disparate locations. Further, the term "infant" as used herein also refers to a baby.

According to various examples, the monitoring hub processes the measurement data to provide information about an infant such as sleep, mobility, stress, position, comfort, health, vigilance, articulation, receptivity to learning, infant well-being, presence of caregiver, environmental conditions, safety of the infant, emotional state of the infant, emotional receptivity, receptivity to learning, etc. In some examples, this information can be provided to a caregiver, such as through the hub directly or through a client device, such as a mobile device. Additional recommendations about care for the infant can also be provided to the caregiver by the monitoring hub, according to various examples.

In particular embodiments, the measurement data and/or processed measurement data can be transmitted to a remote platform, in various examples. This remote platform can collect measurement data and/or processed measurement data from numerous infant monitoring devices in a community. According to various embodiments, the remote platform is a remote infant developmental analysis platform. The remote infant developmental analysis platform may use this aggregated data to determine various patterns and phenomena and use this data to form additional suggestions for caregiving, teaching, etc. For instance, charts on infant growth and development can be formed with the aggregated data. These charts can then be transmitted to individual monitoring hubs and caregivers can see how their respective infants compare to the charts, etc. For instance, an infant's developmental age based on the charts can be compared with their biological age. In other examples, measurement data can be used to develop models for when an infant is receptive to learning, etc. Information from these models can be provided to the individual monitoring hubs and can be provided to caregivers at appropriate times. In yet other examples, behavior models, etc. can be used to provide feedback to caregivers about how to make their infants more comfortable, etc.

In some embodiments, the measurement data can be used to determine an infant's developmental age and select customized learning content for the infant based on the developmental age. According to various examples, customized learning content can be selected based on parental preferences. In addition, selected learning content can be organized into a customized playlist of educational materials that can be presented through the monitoring hub or a portal associated with the remote platform. In some examples, the monitoring hub or remote platform can also interact with social media. For instance, when a particular module of learning content is completed, the monitoring hub or remote platform can provide social media recognition of this achievement, such as through a post to a social media platform.

With reference to FIG. 1, shown is a diagrammatic representation of one example of an infant monitoring system. According to various embodiments, the infant monitoring system is designed to be safe, secure, and easy to use. As shown, the system includes a local monitoring system 101 and a remote system 105. The local monitoring system includes a wearable infant monitoring device 111 and a monitoring hub 113. The remote system 105 includes a platform 115, which is designed to collect data from a community of users. In various examples, information about an infant 107 is collected at the wearable infant monitoring device 111, this information is processed at the monitoring hub 113, and models are developed at the platform 115.

According to various embodiments, the wearable infant monitoring device 111 collects data and provides notifications. The wearable infant monitoring device 111 is an infant-friendly wearable device, which monitors infant activity and other infant related biometric measures. In one embodiment, the wearable infant monitoring device 111 is worn on the ankle of an infant and collects activity and emotional state data and receptivity to leaning data. For instance, the wearable infant monitoring device 111 can collect data regarding an infant's motions, orientation, and physiology. In some examples, the target demographic for the infant is between about 0-24 months of age. Notifications can be provided at the wearable infant monitoring device 111 in some instances. For instance, an LED on the wearable infant monitoring device 111 can indicate to a caregiver 109 that the battery charge is low or that the device is currently charging, etc.

In the present example, measurement data associated with the infant is input 117 into the wearable infant monitoring device 111. This measurement data is then transmitted 119 to a monitoring hub 113. This monitoring hub 113 can perform various functions, depending on the desired application, such as data pre-processing, ambient sensing, content cache, and infant status assessment. In some examples, the monitoring hub includes leaning content and a schedule. For instance, the learning content may include information for caregivers about what to teach to an infant and the schedule can indicate when this content should be appropriately presented, such as based on age or developmental level. This learning content can be obtained from the platform 115 in some embodiments. More specifically, the platform 115 may store various libraries of data, models, schedules, etc. that can be accessed by the monitoring hub 113. For instance, the platform may store models such as an environmental suitability model (predicting a range of environmental conditions and expected infant characteristics corresponding to these environmental conditions), infant orientation model (predicting a position of a infant based on data such as motion and geoposition), learning receptivity model (predicting a time and duration when an infant will be receptive to learning), health model (predicting a health concern such as an epileptic seizure, lying in a prone position associated with increased risk of SIDS, etc.), and development model (predicting measurements, observations, inferences, or other metrics associated with an infant of a particular developmental age). These models may include thresholds for making various determinations, which can trigger notifications to a caregiver. For example, an environmental suitability model can include thresholds for sound pollution, visual clutter, and/or light over-intensity, and exceeding any of these thresholds may trigger a determination that the environmental conditions are not suitable for an infant. The monitoring hub 113 can select and customize content from the library to correspond to the needs and development of a particular infant 107 being monitored. According to various embodiments, the monitoring hub 113 can also provide digital signal processing, a human interface, and data security. In some examples, development models can be evaluated at the monitoring hub 113. Additionally, model-based content adaptation can be provided at the monitoring hub 113 in some applications. Furthermore, the monitoring hub 113 may provide notifications or suggestions to a caregiver based on a determination made at the monitoring hub 113 or platform 115. For instance, if a determination is made that environmental conditions are not suitable for an infant, the monitoring hub can make suggestions including ways to reduce noise, light intensity, visual clutter, etc. In particular, suggestions may include closing windows, turning off lights, reducing the amount of toys or items in the room, etc.

Although not explicitly shown in FIG. 1, a mobile device can also be included in the local monitoring system 101. In some embodiments, the mobile device can communicate with the monitoring hub 113 and/or the wearable infant monitoring device 111. In addition, the mobile device can provide an interface to the local monitoring system 101 for the caregiver 109. For instance, the caregiver 109 may be able to view data about the infant via the mobile device, including information such as biometric data, video, audio, etc. In some examples, the mobile device can act as the monitoring hub 113 itself. According to various embodiments, the mobile device can provide data pre-processing, early warning, and remote observation. The mobile device can also include social and environmental content. In some instances, a caregiver 109 can input information about social and environmental conditions and/or the mobile device can detect various conditions using inputs such as a microphone, camera, etc. In some examples, the mobile device includes content for the caregiver about suggested social interactions or environmental augmentation or adjustments such as music, lights, etc.

According to various embodiments, a caregiver 109, such as a mother, father, nanny, babysitter, or other primary caregiver, is the primary user of the data from the wearable infant monitoring device 111. The caregiver 109 can also provide information to the system such as developmental assessments, nominal infant habits, etc., such a through a mobile device and/or the monitoring hub 113. Information can be provided to the caregiver 109 via monitoring hub 113 and/or a mobile device associated with the local monitoring system 101. For instance, adapted content, infant monitoring, and social engagement is provided through the monitoring hub 113 and/or the mobile device.

In the present example, data from the monitoring hub 113 is transmitted 123 to the platform 115. For instance, raw data, including biometric data, etc. is sent to the platform 115. Information from the platform 115 can also be transmitted 123 to the monitoring hub 113. Transmission 123 to and from the platform may include encryption and/or compression. Encryption can be used to protect sensitive personal information, and compression can aid in smooth and efficient transmission of the data.

According to various embodiments, the platform 115 includes software that facilitates features such as a parent portal, social interfaces, infant learning platform, and content delivery platform. Although not shown explicitly in FIG. 1, caregiver 109 may be able to directly interact with platform 115, such as through one of these portals or platforms. The platform 115 includes content such as infant profiles, infant de-identified data, learning materials, assessment materials, and infant trends. According to various embodiments, information sent to the platform 115 includes data such as development metrics for individual infants, etc. In addition, the platform 115 performs machine learning on aggregated measurement data, sensor data, and any other development metrics to generate models that predict upcoming behaviors, developments, activities, etc., according to various examples. For instance, measurement data can be used to generate models based on patterns in activity, and these models can be used by particular infant monitoring systems to predict an upcoming activity. Specifically, the patterns in activity can include aspects such as physical activity, emotional signals, sleep patterns, behavior, etc. The upcoming activity can include aspects such as sickness, sleep, mobility, stress, position, comfort, health, vigilance, articulation, receptivity to learning, infant well-being, presence of caregiver, environmental factors, safety of infant, and/or emotional state of infant.

In one example illustrating use of the system shown in FIG. 1, the wearable infant monitoring device 111 provides continuous infant temperature monitoring and the caregiver 109 inputs information about diaper changes. The system detects disturbances in the room, such as with a microphone that provides data to the monitoring hub 113. The wearable infant monitoring device 111 then detects measurement data that is associated with a startle response from infant. The monitoring hub 113 determines that the infant 107 is experiencing too many startling responses. In response, the monitoring hub 113 provides a more soothing environment (e.g. using a projector, music, white noise, etc.) or asks the caregiver to provide a more soothing environment.

In some implementations, the caregiver may also have a wearable device (not shown). The caregiver wearable device can be used to infer when the caregiver 109 is interacting with the infant 107, etc. This information can be used by the monitoring hub 113 and/or platform 115 to assess the effectiveness of certain interactions, etc. In addition, monitoring the locations of the infant 107 and caregiver 109 can be used to alert about a wandering or stolen infant in some applications.

According to various embodiments, the system can be used for a single infant or more than one infant. For instance, a system can be used to provide instructions for two babies, such as twins or when a caregiver 109 is caring for multiple babies. This allows the caregiver 109 to interact with one monitoring hub 113 and/or mobile device, which can make monitoring multiple babies easier and more efficient. In such implementations, the additional wearable infant monitoring device(s) can also communicate with a monitoring hub 113.

Figure 2A:
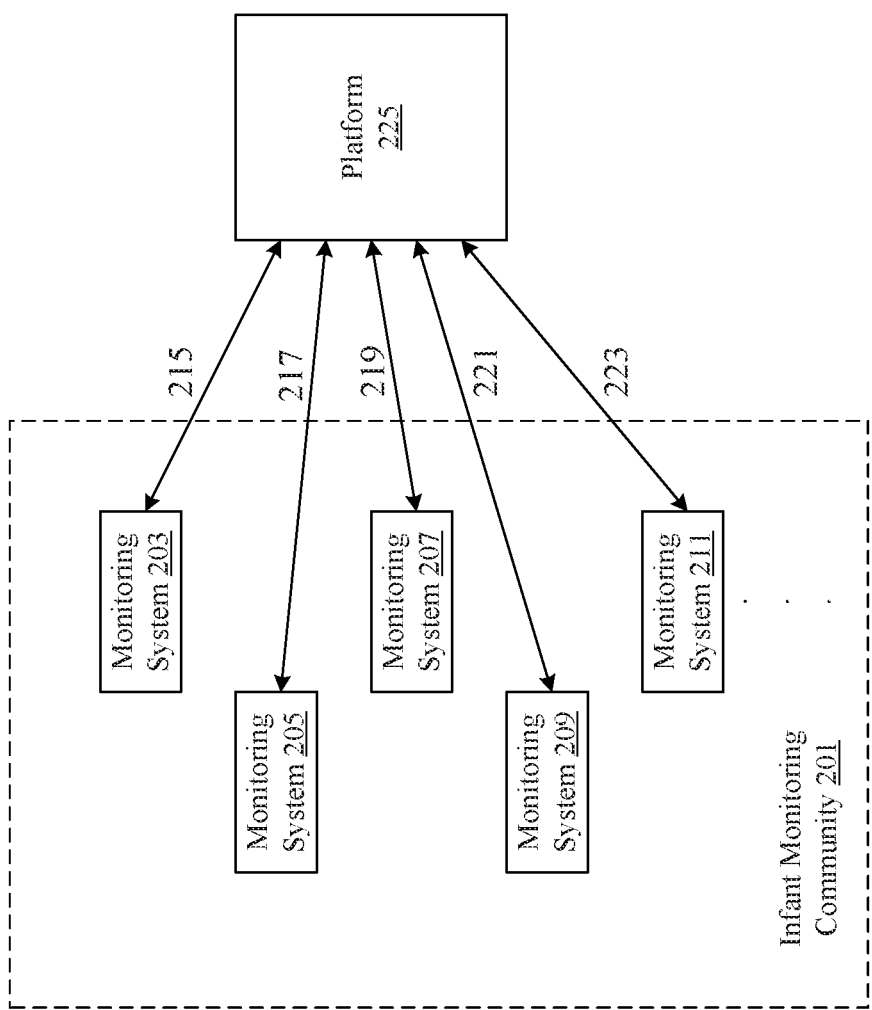
FIG. 2A is a diagrammatic representation of one example of a data aggregation system for gathering information about infants from a community of users monitoring infant activity.

With reference to FIG. 2A, shown is a diagrammatic representation of one example of a data aggregation system for gathering information about infants from a community of users monitoring infant activity. As shown, numerous monitoring systems, such as monitoring system 203, 205, 207, 209, and 211 are part of an infant monitoring community. Any number of monitoring systems can be included, as indicated by the trailing dots in the figure. In some examples, the infant monitoring community 201 includes millions of babies each associated with individual monitoring systems.

In these examples, development metrics from these millions of babies can be gathered at the platform 225 such as a remote infant developmental analysis platform. As referred to herein, aggregated measurement data and sensor data includes development metrics such as measurement data from monitoring devices and sensor data from peripheral devices gathered from the infant monitoring community 201. Similarly, aggregated observations, inferences, etc. refer to data aggregated from the infant monitoring community 201.

In the present example, the monitoring systems 203, 205, 207, 209, and 211 are each like the local monitoring system 101 in FIG. 1. As such, each monitoring system 203, 205, 207, 209, and 211 is associated with a different infant. Each of the monitoring systems 203, 205, 207, 209, and 211 can communicate with the platform 225. According to various embodiments, information sent to the platform 225 from the monitoring systems 203, 205, 207, 209, and 211 includes development metrics, and/or any other data gathered by each of the respective monitoring systems. These development metrics (and/or other data) can be used as input to backend machine learning at the platform 225.

According to various embodiments, content such as content libraries and parameterized infant development models can be stored at the platform 225. This content can be shared with the monitoring systems 203, 205, 207, 209, and 211. For instance, information can be sent to a monitoring system 203 in response to a request from the monitoring system 203. In other examples, information can be sent to a monitoring system 205 at a particular developmental time associated with the infant being monitored by monitoring system 205. In yet other examples, information can be sent in response to a receipt of development metrics from a particular monitoring system 207. As described above with regard to FIG. 1, platform 225 includes features such as a parent portal, social interfaces, infant learning platform, and content delivery platform. Each of the monitoring systems 203, 205, 207, 209, and 211 can access these features at the platform 225. In some embodiments, a parent portal can allow a caregiver to directly communicate with the platform 225, such as through a mobile device or computer, without having to communicate through a local monitoring hub. In addition, the platform 225 includes content such as infant profile, infant de-identified data, learning materials, assessment materials, and infant trends, which may also be accessible to monitoring systems 203, 205, 207, 209, and 211 in various embodiments.

According to various embodiments, machine learning can be used to develop models such as development models, health models, kinematic models, and dynamic models at platform 225. These models can be developed using the information gathered from the monitoring systems 203, 205, 207, 209, and 211 from the infant monitoring community 201. Specifically, the gathered data can be used at the platform for research. The gathered data can be used to discover new metrics, develop population statistics, spot trends, etc. For instance, applying unstructured machine learning to the vast amount of gathered measurement data, such as weight, age, gender, location, associated with numerous babies, various predictions can be made and models developed. For example, models can be developed regarding how to impart learning, social interactions, etc. Other examples include discovering trends or markers, such as characteristics that indicate an infant might get sick soon based on its sleep/wake patterns.

Various aspects can be observed and studied at the platform 225 with the help of machine learning. Some examples include wake/sleep prediction, walking detection, detecting quiescent windows, determining when an infant is missing, determining alertness, and predicting an infant's receptivity to learning.

In one example, wake/sleep predictions can be studied at platform 225. Specifically, activity monitoring can be used to identify wake/sleep transitions. Based on a previous week's sleep/wake transitions, a next transition can be predicted. This type of prediction is based on pulse train completion. The time series of wake/sleep is a pulse train that should (for healthy sleep patterns) have regular pulse width and spacing. By estimating those parameters, the onset of the next wake/sleep transition and the duration of the subsequent state (whether waking or sleeping) can be predicted. As an infant grows, the characteristic spacing and width of the pulses will change (eventually converging on a long duration of sleep at night with shorter naps throughout the day for a healthy infant). These changes typically happen on the time scale of months, so sleep predictions may look at time frames on the order of the last week. By observing patterns on this time scale, changes in the sleep patterns can be predicted on a faster time scale than those patterns evolve.

Gathering wake/sleep patterns from a myriad of babies and analyzing this data can help form models of healthy patterns at different developmental levels or ages. Babies typically need different amounts of sleep in different cycles, depending on the infant's age. For instance, a newborn may need about 16-20 hours of sleep per day, a 3-week-old may need about 16-18 hours of sleep per day, a 6-week-old may need about 15-16 hours of sleep per day, a 4-month-old may need about 9-12 hours of sleep per day plus two naps of about 2-3 hours each, a 6-month-old may need about 11 hours of sleep per day plus two naps of about 1.5-2.5 hours each, a 9-month-old may need about 11-12 hours of sleep per day plus two naps of about 1-2 hours each, a 1-year-old may need about 10-11 hours of sleep per day plus two naps of about 1-2 hours each, an 18-month-old may need about 13 hours of sleep per day plus two naps of about 1-2 hours each, and a 2-year-old may need about 11-12 hours of sleep per night plus one nap of about 2 hours long.

Various factors can be used to predict sleep schedules, such as Galvanic Skin Response (GSR) activity (i.e. arousal), last known sleep cycle, audio detected by a sensor, etc. In some examples, models are created for predicting predict sleep schedules based on an infant's data and/or aggregated data from numerous babies. According to various embodiments, the sensors include mechanisms for determining whether the infant is prone or supine or in some other position. Sensors may include accelerometer, magnetic sensors, gyroscopes, motion sensors, step counters, rotation vector sensor, gravity sensor, orientation sensor, and linear acceleration sensor. According to various embodiments, it is recognized that is particularly useful in the infant context to determine infant position, such as whether the infant is resting supine, prone, sitting, etc.

A wearable casing for the sensors may be worn by an infant in a particular manner such that directionality is known. For example, the wearable casing may be an anklet, bracelet, sock, shoe, diaper, or included in a onesie. An indicator may be included on the wearable directing a caregiver on the appropriate positioning or directionality of the wearable. In addition, observations can be made about the infant's sleep patterns and sleep state, and the infant's level of fatigue can be estimated in some examples. For instance, if the sleep schedule for the infant indicates that the infant is normally asleep at this time but is not currently asleep, then a guess can be made that the infant is probably fatigued. Specifically, if the infant is usually napping at this time and is currently awake, a guess can be made that the infant may be irritable. In some applications, suggestions can be made to the caregiver regarding providing a calm environment for the infant to promote sleep, avoiding stimulation or teaching, etc. According to various embodiments, models developed at the platform 225 can also be used to predict development for a particular infant when the particular infant is compared to these models.

In another example, detection of walking can be studied at platform 225. Specifically, activity data from the infant monitoring community 201 can be used to determine when an infant is walking or moving in various ways. For instance, pre-walking may include smooth accelerations, whereas walking may include sharp spikes in acceleration associated with foot falls at reasonable periods. Also, joint angles and bone positions with respect to models that include torso bounce and ground reaction force can also indicate whether an infant is walking or moving in some other way. By analyzing data about infant movements, models can be predicted regarding walking detection. In some examples, the measurement data associated with an infant can be combined with information provided by a caregiver about when the infant walked, etc. Comparing a particular infant's walking to models can help predict the infants developmental age, etc. Mechanisms for developing models relating to walking, etc. can also be applied to data sets outside the infant category. For instance, this system could also be used with physical therapy patients of all ages.

In another example, mechanisms can be used at platform 225 to determine "quiescent windows," when an infant is inactive, quiet, and still. Developing models predicting these "quiescent windows" and using them at the monitoring systems can lift health and hygiene of the babies, such as by increased use of diapers.

In yet another example, a missing infant can be detected based on models developed at platform 225. Predictions can be made about when the infant is moving not under its own power. For instance, patterns of movement or location can be studied to determine when an anomaly is detected. In some examples, geolocation can be included to indicate when infant is traveling with someone other than an authorized caregiver. In some applications, a caregiver can be notified to check on the infant and confirm the infant's whereabouts. This can be particularly helpful in keeping babies safe not only from abductions, but also if the infant is inadvertently left in a car or other location. Furthermore, this technology could be used with older children to determine if they have wandered off, etc.

In another example, alertness of an infant can be studied at platform 225. Specifically, measurement data can be studied to detect when an infant is alone and alert, and the length of time the infant has been alone and alert. Detecting when an infant is alone can be based on factors such as background audio analysis, but is complicated by situations where the infant is not actually alone, but is just being ignored. Input from caregivers can also be included. Models can be used to predict when babies might benefit from interaction or learning experiences.

In another example, receptivity to learning can be studied at platform 225. Determining appropriate windows of time for an infant's receptivity to learning can help caregivers know when to present teaching materials or interaction in a more productive manner. In order to determine these appropriate windows, numerous factors can be considered. Specifically, data such as sleep/wake cycles, vocalization, temperature, age, gender, weight, and other biometric measures collected from infant monitoring community 201 can be considered. Additionally, data from one or more of an intentionality detector, gaze detector, shared attention detector, and cognition detector can be used to determine an infant's receptivity to learning. Furthermore, data about an infant's environment, such as audio levels, time of day, location, ethnicity, etc. can also be considered. Additional data from one or more caregivers, such as diaper changes, self-reporting, and lesson feedback can also be considered. This data can be analyzed to help determine when an infant is most receptive to learning and what type of material is appropriate to present at a particular time. Models can be created that indicate windows of receptivity to learning and the appropriate teaching/learning materials. These models can be used at individual monitoring systems for application to individual babies. For instance, the absence or presence of specific stimulation, as indicated by the system or from caregiver input, such as auditory, sensory, tactile, etc. can be used to select an age-weighted, progress-weighted learning program from a model developed at the platform 225. Specifically, knowing the age of the infant can help determine whether physical, cognitive, or language learning materials should be presented. For example, babies between about 0-3 months may be receptive to learning gross motor skills, babies between about 3-9 months may be receptive to learning gross motor skills and language, babies between about 9-18 months may be receptive to learning fine motor, language and social skills, and babies between about 18-24 months may be receptive to learning fine motor, language, social, and discrimination skills. At certain ages, there may be a hierarchy of learning, wherein the infant is receptive to multiple skills, but that these skills can be presented in a hierarchy based on the infant's developmental level. According to various embodiments, a particular infant monitoring system can predict windows of receptivity when an infant is receptive to learning. In these embodiments, the infant monitoring system processes measurement data and selects and customizes learning materials appropriate for the infant. The learning materials can be customized based on factors such as the infant's developmental age, readiness, previous learning experiences, caregiver feedback, etc.

Figure 2B:
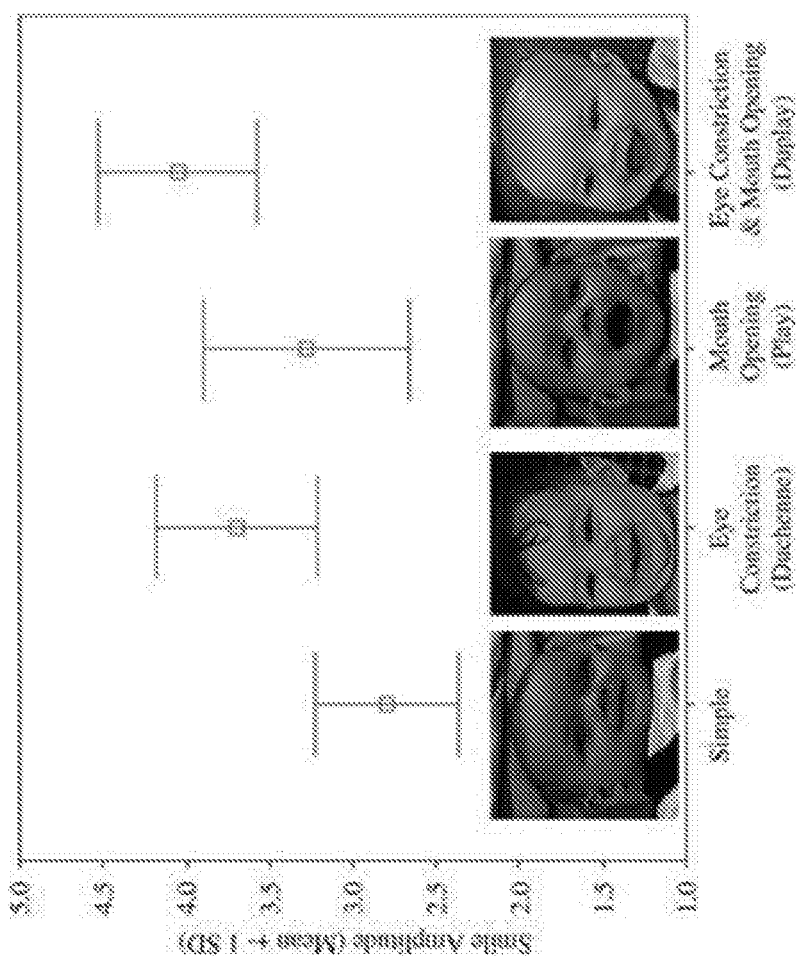
FIG. 2B is an example chart showing smile intensity that may contribute to the meaning of smiles.

Various features can be used to assess an infant's receptivity, such as an intentionality detector, gaze detector, shared attention detector, and cognition detector. In one example, an emotional intensity hypothesis can be used to determine an infant's receptivity to learning. In particular, an infants smile amplitude can be measured based on data from a camera or other input device in a monitoring system, and the infant's receptivity can be correlated. With reference to FIG. 2B, shown is a graph illustrating various smile amplitude versus various facial expressions. These facial expressions can indicate the amount of enjoyment an infant is experiencing at a given time. The information in this chart can be used along with data from an infant monitoring system such as a camera feed, audio levels, etc. to determine when an infant is in a good state to learn. In the graph shown in FIG. 2B, approach and withdrawal indexed by patterns of gazing and movement during games contribute to the meaning of smiles (Fogel et al., 2000). For example, during peekaboo games, infants tend to gaze at the parent during all types of smiles, suggesting approach-oriented visual attention. During the climax of tickle games, by contrast, infants engaging in open-mouth smiles with eye constriction show mixed patterns of both gazing at and away from parents. Such patterns may correspond to feelings of enjoyment of active participation in a highly arousing situation and enjoyment of escape. These findings suggest that the same smiling actions can reflect different positive emotions depending on co-occurring infant action and the dynamics of social process.

According to various embodiments, the coordination of smiles with gazing changes and becomes more precisely patterned with age. Simulation studies suggest that, at 3 months, the pattern of gazing away during a smile actually occurs less than expected by chance. The simulation studies indicate that 3-month-olds tend to begin and end their smiles within the course of a gaze at the parent's face. That is, early expressions of positive emotion are dependent on continuous visual contact with the parent. By 6 months, infants redirect their attention after sharing positive emotional expressions with their parents. They tend to gaze at mother's face, smile, gaze away, and then end the smile. Such gaze aversions—at least among 5-month-olds playing peekaboo—tend to occur during higher intensity smiles and smiles of longer durations. Accordingly, information gathered about an infant's smiles and gaze can also help to determine an infant's age, etc. In turn, this can help determine what type of learning materials or activities should be presented to the infant during a window of receptivity.

According to various embodiments, analysis at platform 225 is an ongoing process. Various observations, patterns, models, can continually be discovered, refined, etc. Consequently, these models can change over time based on the input from the infant monitoring community 201. In some examples, expert models can initially be used and replaced with continually refined models.

Figure 3:
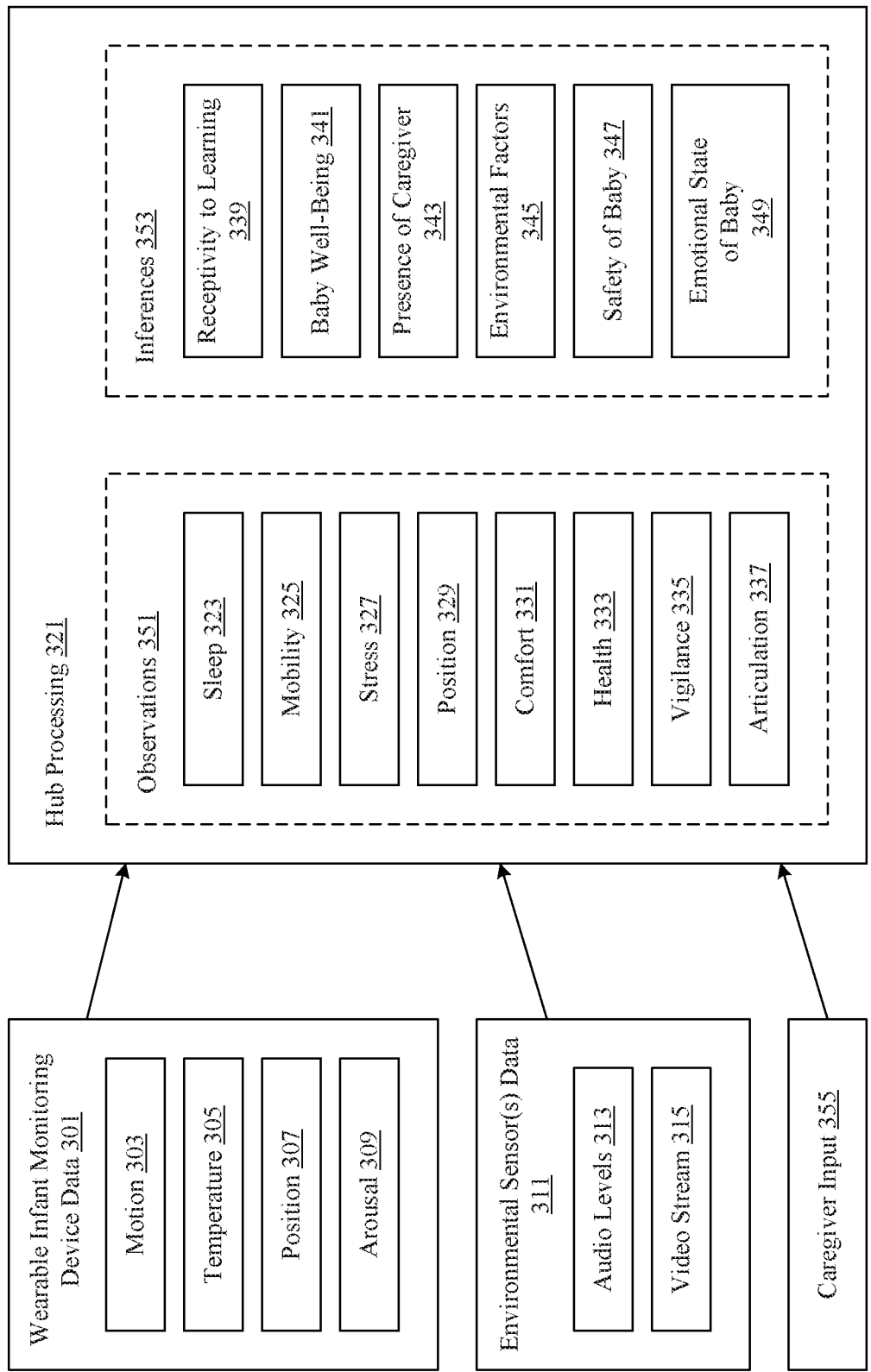
FIG. 3 is a diagrammatic representation of one example of an infant monitoring data aggregation and processing system.

With reference to FIG. 3, shown is a diagrammatic representation of one example of an infant monitoring data aggregation and processing system. This system includes an infant monitoring device, environmental sensor(s), and a monitoring hub. Measurement data is gathered by the wearable infant monitoring device and environmental sensors and sent to the monitoring hub for processing. As shown in the diagram, wearable infant monitoring device data 301 gathered by the infant monitoring device includes motion 303 (i.e., activity), temperature 305, position 307, and arousal 309. In some examples, the position 307 can include a geoposition of the infant. Environmental sensor(s) data 311 gathered from devices such as microphones or cameras includes audio levels 313 and video stream 315. However, in some examples, the environmental sensors can be omitted, such as when a simplified system is employed. For instance, if the system is used during an outing, cameras, peripheral devices, etc. may be disconnected and only input from the wearable infant monitoring device may be used.

In the present example, the monitoring hub receives data from the wearable infant monitoring device and the environmental sensor(s). According to various embodiments, the data is collected continuously around the clock. In some examples, this may mean periodic but consistent monitoring, such as at designated intervals of time. Hub processing 321 can be applied to the data received to yield various observations 351 and inferences 353. Some of the observations 351 that can be made at the monitoring hub based on data measurements include sleep 323, mobility 325, stress 327, position 329, comfort 331, health 333, vigilance (e.g. infant attention, cognitive responsiveness) 335, and articulation (i.e., speech articulation) 337. Some of the inferences 353 that can be made at the monitoring hub based on measurement data include receptivity to learning 339, infant well-being 341, presence of caregiver 343, environmental factors 345, safety of the infant 347, and emotional state of the infant 349. Although observations 351 and inferences 353 are shown as different categories, various items can be categorized in either set without deviating from the scope of this example.

Numerous combinations of measurement data from the wearable infant monitoring device and/or the environmental sensor(s) can be used to make observations or inferences. According to various embodiments, data is first collected about the infant, the data is scaled, and then a model or prediction is applied to the infant. Specifically, aggregated data can be collected at the platform, as described above with regard to FIG. 2, and models, predictions, etc. can be developed. These models, etc. can then be accessed from the platform by individual monitoring hubs. A particular infant monitoring system can then perform hub processing 321 that can use these models, etc. to analyze measurement data for a particular infant.

Observations and/or inferences can be made for a particular infant and made available to a caregiver. This information can help the caregiver better care for the infant. In some examples, the information can be used to provide guidance or advice to caregiver, such as through the monitoring hub and/or mobile device. For instance, hub processing 321 may determine that the infant is currently in a particular position 329 (also referred to as orientation) that may correlate with a breathing problem (associated with SIDS, etc.) or non-preferred/unsafe position. This observation 351 can lead to a notification to the caregiver about this finding. In some examples, the notification can also include recommendations about how to reposition the infant, etc. In another example, the infants growth can be monitored, such as by caregiver input 355, or by a sensor such as a scale (not shown) that is connected to the system as a peripheral device. This growth can be used to estimate the infant's developmental age and from this information a schedule can be developed at the hub outlining when an infant should be taught something. In yet other examples, motion 303, such as a shake of the infant's hand can be monitored to determine motor development, blood flow can be monitored and correlated to brain development, and electrodermal activity can be monitored to predict health 333 occurrences such as epileptic seizures. In another example, predictions about the infant's activity can be made using data from the accelerometer and GSR, as described in more detail with regard to FIG. 4. Based on this data, a prediction can be made about whether the infant is awake/asleep, eating, crawling/walking/running, etc. Various inputs can be monitored to yield observations and predictions about the infant.

Various observations 351 can be made about the infant based on measurement data associated with the infant. For instance, sleep 323 observations can be used to predict the upcoming sleep patterns of the infant, and can alert the caregiver if sleep patterns are disturbed. For instance, if the sleep patterns are disturbed, this may indicate that the infant is getting sick, etc. Observations about mobility 325 can help determine how the infant is moving relative to its developmental age and can be used to advise the caregiver about how to teach or help the infant at a developmentally appropriate level. Observations about stress 327 can help determine if there are conditions that could be changed to reduce the infants stress. As mentioned above, position 329 can be observed to see if a current position is associated with a non-favored or unsafe position and the caregiver can be notified. Position 329 can also refer to the infants orientation, such as whether the infant is lying down, standing up, crawling, walking, etc. Furthermore, the infant's orientation can include whether the infant is prone or supine. These observations can be made based on data such as motion 303 and position 307. Observations about comfort 331 can be made and findings can be provided. Observations about health 333 can also be made, such as whether the infant's temperature constitutes a fever, etc. Observations about vigilance 335 includes whether an infant is alert and awake, etc. In addition, observations about articulation 337 may include detecting speech articulation using environmental sensor data 311 such as audio input. Although particular examples of observations are shown and described, it should be recognized that additional observations can also be made within the scope of this disclosure. Likewise any combination of observations (such as a limited set of those shown) can be used depending on the desired operation of the system.

Various inferences 353 can be made about the infant based on measurement data associated with the infant. For instance, inferences about the infants receptivity to learning 339 can be made. As described above with regard to FIG. 2, various factors can be used to assess receptivity to learning 339 such as developmental age. These inferences can be used to determine when and/or what the infant should be learning. Providing appropriate learning materials (such as advice to the caregiver about what to teach or how to interact with the infant) at the appropriate time can help with the infant's brain development Inferences about the infants well-being 341 can be made in some examples. For instance, considering factors such as the health and emotional state of the infant can indicate the infant's overall well-being. In some examples, these inferences can help to determine how effective a particular caregiver is meeting the infant's needs, etc. Inferences about the presence of a caregiver 343 can also be made. For instance, measurement data from the infant monitoring device and/or a caregiver device can indicate whether the caregiver is present at a particular time. Inferences about environmental factors 345 can also be made. For instance, environmental sensor data 311, such as audio levels 313, can be used to assess what is good for the infant versus what is not good for the infant. In some examples, the system can use a predictive model to identify if an environment is cognitively good for an infant, using factors such as visual clutter, sound pollution, light over-intensity, not enough interaction, etc. Specifically an environmental suitability model can be used that reflects a relationship between a range of environmental conditions and expected infant characteristics corresponding to these environmental conditions. For example, visual clutter may be associated with a higher degree of stress, sound pollution may be associated with less (or lower quality) sleep, etc. Additionally, inferences can be made about safety of the infant 347. In some examples, safety may include the infant's position (e.g. 'back to sleep'), and other physical safety features. In other examples, safety may include whether the infant is "missing," such as if the infant has wandered off, fallen, or been taken by an unauthorized caregiver. Inferences about the emotional state of the infant 349 can also be made, such as whether the infant is stressed, etc. In some examples, these inferences can help to determine how effective a particular caregiver or interaction is for placating the infant's stress. In other examples, these inferences can be used to determine what types of activities, environments, schedules, etc. best suit this particular infant. Although particular examples of inferences are shown and described, it should be recognized that additional inferences can also be made within the scope of this disclosure. Likewise any combination of inferences (such as a limited set of those shown) can be used depending on the desired operation of the system.

Figure 4:
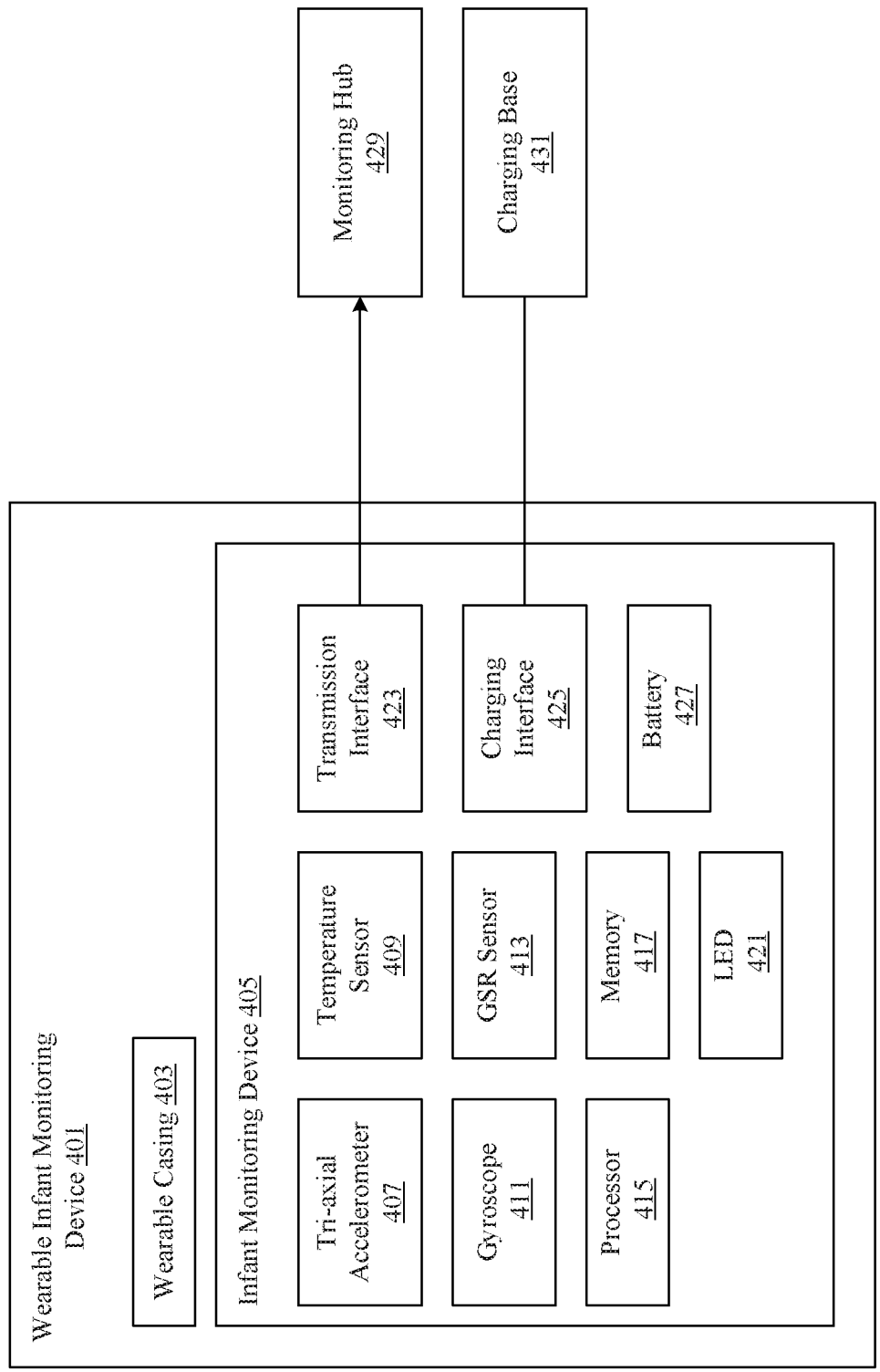
FIG. 4 is a diagrammatic representation of one example of a wearable infant monitoring device.

With reference to FIG. 4, shown is a diagrammatic representation of one example of a wearable infant monitoring device. The wearable infant monitoring device 401 is an infant-friendly wearable device, which monitors infant activity and other infant related biometric measures. As shown in the present example, the wearable infant monitoring device 401 includes a wearable casing 403 and an infant monitoring device 405. According to various embodiments, the infant monitoring device 405 is detachable from a wearable casing 403, examples of which are described with regard to FIGS. 5A-5C.

In one embodiment, the wearable infant monitoring device 401 allows the infant monitoring device 405 to be worn on the ankle of an infant. The infant monitoring device collects activity and emotional state data. In the present example, this data is collected continuously around the dock. Specifically, infant monitoring device 405 collects data and provides notifications. In various examples, the infant monitoring device 405 can be used for data logging. According to various embodiments, the device is expected to store data from multiple sensors and also do moderate processing of the data from the sensors. This processing may include filtering, dimensionality reduction and cleanup of the raw data. Because the device is also intended for use as an infant monitor, low-latency processing of some sensors e.g. position may be required. However, in some instances, the infant monitoring device 405 may not store content. By including less content and/or other features, the infant monitoring device 405 can be designed with a smaller size to allow for a more comfortable experience for the infant. In addition, including fewer features can also reduce complexity of the device, and thereby reduce possible malfunctions, etc.

In the present example, infant monitoring device 405 includes various components, such as tri-axial accelerometer 407, temperature sensor 409, gyroscope 411, galvanic skin response (GSR) sensor 413, processor 415, memory 417, light emitting diode (LED) 421, transmission interface 423, charging interface 425 and battery 427. The tri-axial accelerometer 407 measures an infant's activity, such as movements registering more than about 50 Hz in some examples. The accelerometer data is used to measure the infant's movement. The temperature sensor 409 measures the infant's body temperature. According to various examples, the infant's body temperature is continuously monitored. The gyroscope 411 measures the infant's orientation. The GSR Sensor 413 measures galvanic skin resistance (GSR). For instance, the GSR sensor 413 can measure the amount of sweat or moisture detected on the body. The GSR is a low latency arousal measurement, and can be used to measure the infant's stress levels.

In the present example, the processor 415 can be an ARM Cortex M0-M3, or the like, depending on the application. In some examples, the processor 415 can have limited or no digital signal processing (DSP). The memory 417 can be of any size, depending on the application. In some examples, the memory 417 can have a size of 384 kb. The transmission interface 423 can be used to communicate with a monitoring hub 429. Specifically, measurement data can be sent from the infant monitoring device to monitoring hub 429. According to various examples, transmission interface 423 can use a transmission protocol such as Bluetooth LE (BLE 4.0), although any suitable protocol can be used.

In the present embodiment, the infant monitoring device 405 includes an LED 421 that can communicate status information to a caregiver. For instance, the LED 421 can indicate that the device is charging when the LED is illuminated. In some examples, the LED can be a single neo-pixel LED.

According to various embodiments, battery 427 stores charge for operation of the infant monitoring device. One type of battery that can be used is a Li—Po battery (110 mAh), which is adequate for a day's operation. However, any type of battery can be used, depending on the application and desired use. In some examples, the battery can be recharged via a charging interface 425 that can be periodically placed in contact with a charging base 431. For instance, the device can be charged using contact and/or wireless inductive charging. If the battery life can be expected to last at least 24 hours in the present example, then the device can be charged once per day. The battery 427 and/or charging interface 425 includes a charge circuit in some instances.

According to various embodiments, the wearable infant monitoring device must be safe, secure and easy to use. In the present example, the infant monitoring device 405 is waterproof and hypoallergenic. In addition, the wearable infant monitoring device contains no serviceable parts and the electronic components are completely sealed in this example.

In some examples, the target demographic for the infant is between about 0-24 months of age. Of course, this age range can be expanded or contracted depending on the particular application or needs being addressed. In addition, although the wearable infant monitor device may be used primarily indoors in some applications, the infant monitoring device can also be used outdoors according to various embodiments. For instance, the infant monitoring device can be used during an outing or trip. If the infant monitoring system includes one or more peripheral devices such as a camera, microphone, etc. that is located in a stationary position like the infant's room, certain features may not be available when the device is used outdoors. However, continuous monitoring of the infant can continue for measurements such as temperature, activity, GSR, position, etc. remotely in some examples.

Figure 5C:
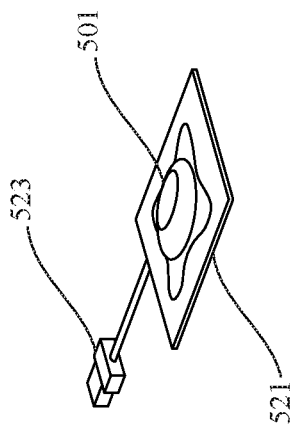
FIG. 5C is a diagrammatic representation of another example of an infant monitoring device docked on a charging base.
Figure 5B:
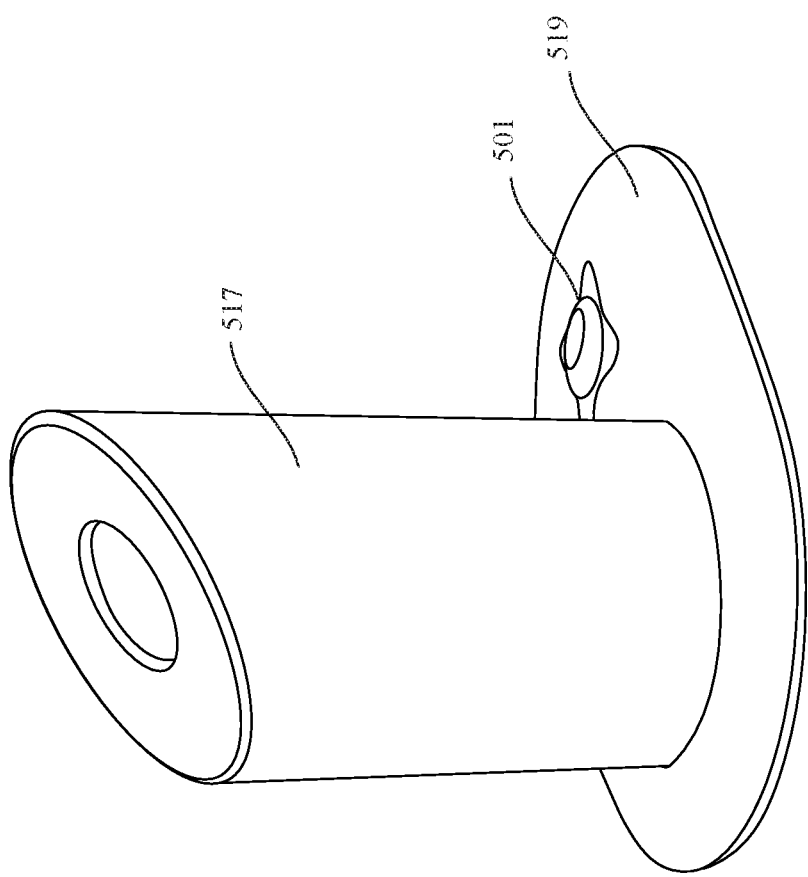
FIG. 5B is a diagrammatic representation of one example of an infant monitoring device docked on a charging base.

FIGS. 5A-5C illustrate examples of infant monitoring devices being used in different contexts. With reference to FIG. 5A, shown is a diagrammatic representation of one example of an infant monitoring device and a wearable infant monitoring device. In particular, infant monitoring device 501 is shown with a base 507, body 505 and LED window 503. When the infant monitoring device 501 is engaged 509 with wearable casing 515 the wearable infant monitoring device 511 is ready to wear by an infant. For instance, the wearable infant monitoring device can be worn around the ankle of an infant and the ends can be secured, such as by a snap or other closure. In some examples, the infant monitoring device 501 can be engaged with the wearable casing 515 through a snug fit, wherein the body 505 overlaps one side of the wearable casing 515 and the base overlaps the other side. In such examples, the body 505 and base 507 may be connected with a rod that has a smaller cross-section than that of the body 505 or base 507. Furthermore, in these examples, the wearable casing can be made of an elastic material that allows some stretching to fit and secure the infant monitoring device 501. In other examples, the base 507 may slip into a pocket or sleeve located in the wearable casing 515.

Although a particular example of an infant monitoring device 501 and wearable casing 515 are shown, various designs and configurations are possible within the scope of this disclosure. Specifically, infant monitoring device can be made in any of a variety of shapes. For instance, the body 505 can be square instead of circular, the base 507 can be circular instead of square, etc. Furthermore, the wearable casing 515 can be made in various shapes and designs. For instance, the wearable casing can alternatively be designed as a continuous loop that may or may not be adjustable in diameter. In other examples, different fastening devices can be used to secure the ends of a wearable casing 515 such as a buckle (wristwatch style), mating sides that snap together, etc.

With reference to FIG. 5B, shown is a diagrammatic representation of one example of an infant monitoring device docked on a charging base. As shown, the charging base 519 is part of an infant station. According to various embodiments, an infant station includes various features such as a charging station (shown in the present example with an infant monitoring device 501 docked to it), peripheral devices, etc. The peripheral devices include components such as a projector 517, camera, microphone, speaker, screen, input device, etc. In some examples, the infant station includes software that allows data pre-processing, ambient sensing, content cache, and infant status assessment. Furthermore, the infant station includes content such as leaning content and schedule(s), in some instances. In addition, the infant station can operate as a monitoring hub in some examples.

In the present example, the charging station can be induction-based. The projector 517 may be used to display lights or images in an infant's room, etc. Although not shown, the infant station may include a power cord that can be plugged into an outlet, or the like, which can provide power for the various components of the infant station. In some examples, the peripheral device(s) can be removable from the infant station.

With reference to FIG. 5C, shown is a diagrammatic representation of another example of an infant monitoring device docked on a charging base. In particular, the charging base 521 includes a plug 523 that can be used to provide charge via a USB port, micro USB port, etc. As shown, an infant monitoring device 501 is docked on the base 521. In the present embodiment, the charging base is induction-based. However, alternative connections can be implemented within the scope of this disclosure. This type of charging base may be convenient if the infant monitoring device 501 is used remotely such as during travel or an outing, especially if a mobile device is used by a caregiver to view monitoring information. The charging base can be used with the mobile device to charge the infant monitoring device 501 on-the-go because the charging base is small and easy to pack, store, and use.

Figure 6:
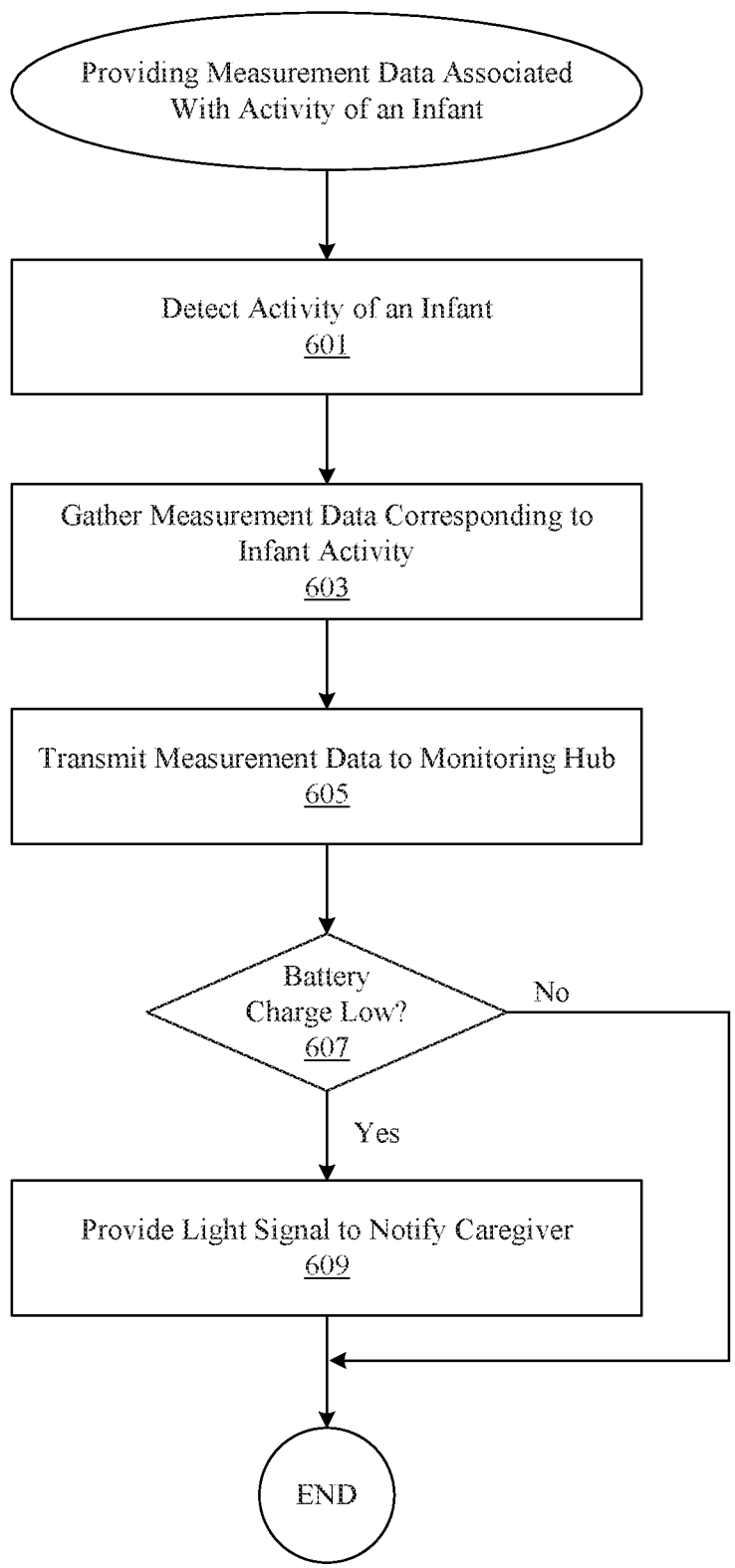
FIG. 6 is a flow diagram of one example of a process for providing measurement data associated with activity of an infant.

FIG. 6 is a flow diagram of one example of a process for providing measurement data associated with activity of an infant. In the present example, activity of an infant is detected at 601. This activity is detected by an infant monitoring device, as described above with regard to various embodiments. Detection may be based on a change in measurements, such as movement or a temperature change, in some examples. Alternatively, detection may correspond to periodically detecting activity based on a schedule, set times, etc. The infant monitoring device then gathers measurement data corresponding to the activity at 603. This measurement data includes information such as motion (i.e., activity), temperature, position, and arousal, as also described above with regard to various embodiments. The measurement data is then transmitted to a monitoring hub at 605. As described above, the monitoring hub can then process the data and provide information about the infant's activity to a caregiver. According to various embodiments, the monitoring hub can also provide this data to the platform for further analysis.

In the present embodiment, the infant monitoring device can also include a check to make sure its battery is sufficiently charged at 607. If the battery charge is low, a light signal can be illuminated to notify the caregiver 609 to charge the infant monitoring device. For instance, an LED located on the infant monitoring device can be illuminated. Alternatively or additionally, a notification can be sent to the caregiver via the monitoring hub and/or a mobile device to charge the infant monitoring device. If the battery charge is not found to be low, no notification is provided. As shown in the present embodiment, this battery charge check is performed after measurement data is provided. By including the battery check as part of this process, the battery is checked often. However, it should be recognized that the battery check at 607 and notification 609 can be omitted from this process in some examples, and the battery check can be performed at other times, such as at periodic intervals or set times.

Figure 7A:
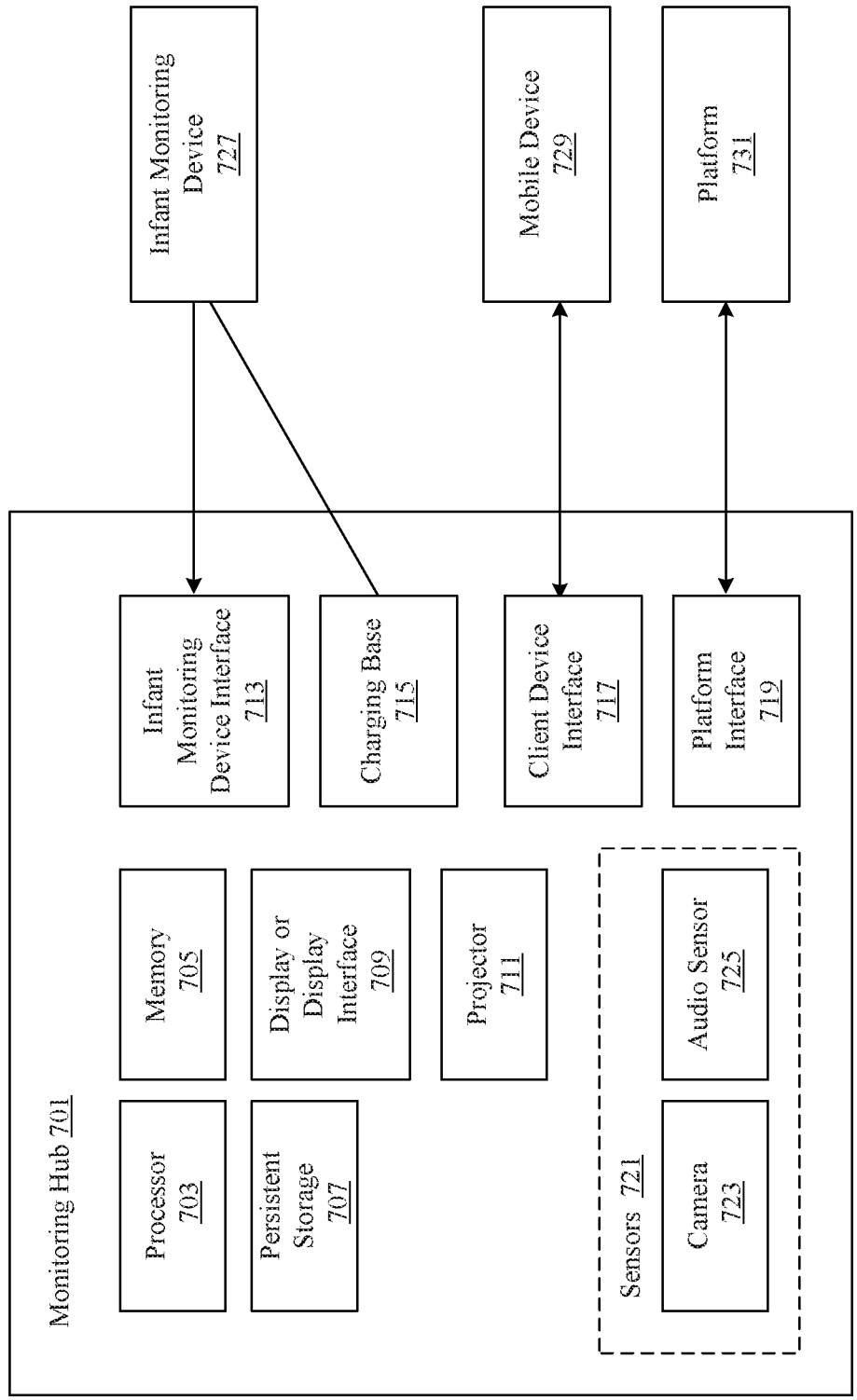
FIG. 7A is a diagrammatic representation of one example of a monitoring hub.
Figure 7B:
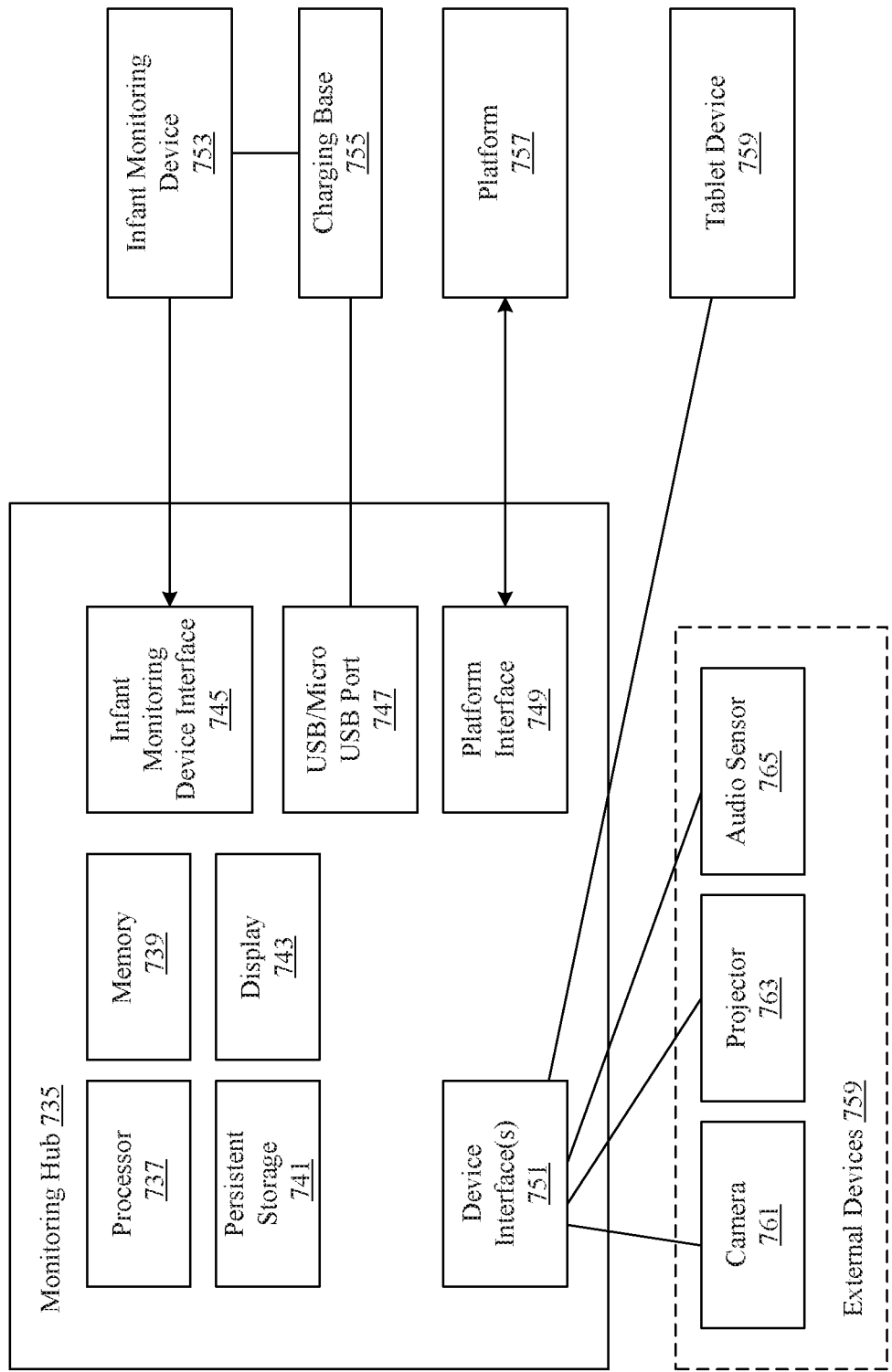
FIG. 7B is a diagrammatic representation of another example of a monitoring hub.

FIGS. 7A-7B illustrate examples of monitoring hubs. Various configurations can be used for a monitoring hub within the scope of this disclosure. With reference to FIG. 7A, shown is one example of a monitoring hub. As described above with regard to various examples, a monitoring hub 701 can receive measurement data from an infant monitoring device 727 and can process this measurement data at the monitoring hub 701.

According to various embodiments, monitoring hub 701 can provide data pre-processing, ambient sensing (local sensing of environment, vibration sensing, audio sensors, cameras), content cache, and/or infant status assessment. The monitoring hub 701 can also include learning content and schedule(s). In addition, the monitoring hub can provide digital signal processing, a human interface, and data security. Furthermore, model-based content adaptation can be provided at the monitoring hub 701. Accordingly, models and library content obtained from the platform 731 such as a remote infant developmental analysis platform can be tailored for the infants developmental age and needs. Specifically, development models can be evaluated at the monitoring hub 701 and content from the library can be selected and customized. One example of content adaptation as applied to interactive activities includes selecting a sequence of interactive activities that is developmentally appropriate and doesn't exhaust the infant. In particular, a determination can be made about a particular infant's developmental age and the duration of an interaction window appropriate for this age. Using this information, content from the content library stored at the platform 731 can be selected and adapted to be appropriate for the infant. This adapted content can then be presented to the infant during an appropriate interaction window.

In the present example, the monitoring hub 701 includes a processor 703, memory 705, persistent storage 707, display or display interface 709, projector 711, sensors 721 (including camera 723 and audio sensor 725), infant monitoring device interface 713, charging base 715, client device interface 717, and platform interface 719. Although particular components are shown, it should be recognized that some of these components can be omitted without deviating from the scope of this disclosure. For instance, the projector 711 could be removed. Additional components can also be included depending on the desired operation of the monitoring hub 701.

According to various embodiments, the monitoring hub 701 can act as an infant station, such as that described with regard to FIG. 5B. In these embodiments, the infant station includes software that allows data pre-processing, ambient sensing, content cache, and infant status assessment Content that can be included includes learning content and schedule(s).

In the present embodiment, processor 703 and memory 705 can be used to process data measurements received from infant monitoring device 727. Specifically, this data can be processed to develop observations and/or inferences as described above with regard to FIG. 3. In addition, processor 703 and memory 705 can be used to customize content for the infant such as learning materials to be age appropriate. Persistent storage 707 can store content and schedule(s), as well as any models, charts, etc. received from the platform 731. Furthermore, persistent storage 707 can store information specific to the infant.

In the present example, display or display interface 709 allows a caregiver to view and/or interact with the monitoring hub 701. For instance, notifications, alerts, suggestions, etc. can be displayed for the caregiver through the display or display interface 709. In some instances, the display may be a screen or monitor. In addition, an input device, such as a keyboard may be included, especially if the display is not touch sensitive. In other instances, a display interface may include a port that allows a monitor to be connected as a peripheral device. In addition, the monitoring hub 701 can be connected to a computer such as a laptop, desktop, etc.

In some examples, a projector 711 can be included as part of the monitoring hub 701. For instance, a projector 711 can be included as part of an infant station and can be used to display lights or images for the infant to see. This feature can be useful to augment the environment with soothing lights, colors, or images. In some examples, this may be used to present learning content to the infant.

In the present example, sensors 721 include camera 723 and audio sensor 725. Camera 723 can be used to transmit video for a caregiver to see on a monitor, such as through a mobile device 729. Camera 723 can also be used to gather data measurements associated with the infant such as position. Audio sensor 725 can be used to transmit audio for a caregiver to hear, such as through a mobile device 729. Audio sensor 725 can also be used to gather data measurements associated with the infant's surroundings and environment. In addition, the audio sensor 725 can be used to gather data measurements about sounds from the infant, such as cries, verbal articulation, etc. In some examples, the sensors 721 can be removable from the monitoring hub 701, especially to allow better positioning of these devices relative to the infant. Other components of the monitoring hub 701 may be removable as well, such that the monitoring hub 701 has a modular style.

In the present embodiment, infant monitoring device interface 713 facilitates wireless communication with the infant monitoring device 727. In addition, the infant monitoring device 727 can be charged at a charging base 715 associated with the monitoring hub 701. The charging base 715 can be induction-based, such that the infant monitoring device 727 can be placed in contact with the charging base 715 during charging. One example of a charging base included in an infant station is described above with regard to FIG. 5B.

According to various embodiments, monitoring hub 701 includes a client device interface 717 that allows the monitoring hub 701 to communicate wirelessly with a mobile device 729, such as a smart phone, tablet, or the like. A mobile device 729 includes software that facilitates features such as data pre-processing, early warning, and remote observation. In addition, content that can be included on the mobile device 729 includes learning, social, and environmental information. The caregiver is the typical user of the mobile device 729, and can view various data from the infant monitoring device 727. In some instances, raw data measurements from the infant monitoring device may be viewed. However, processed information from the monitoring hub 701 may provide more useful information for the caregiver, such as measures of health and optimal times and methods to deliver learning information to the infant. In addition, as described above, information from sensors 721 may be accessible from mobile device 729. In various embodiments, an API interface can also be provided to third parties to allow for more applications to run on the mobile device 729.

According to various embodiments, the infant monitoring device 727 and/or monitoring hub 701 can communicate with IOS and/or Android devices. In particular, BLE is a communication stack that can be used to exchange data and upgrade firmware. In the present embodiment, the API includes access to raw data from the sensors in debug mode. A storage API can be provided for the sensors, allowing data to be downloaded and processed by the mobile device 729 on demand.

Although not shown, a tablet device can also communicate with the monitoring hub 701 through the client device interface 717. The tablet device can serve as an accessory in the delivery of structured learning-focused interactions to the caregiver for use with the infant. In some examples, the tablet will have additional sensors useful in assessing babies' growth parameters. However, according to various embodiments, the infant is not expected to interact with the tablet during the first 24 months.

In the present example, a platform interface 719 is used to communicate with platform 731. As described above with regard to various examples, the monitoring hub 701 can send data to and receive information from platform 731. For instance, monitoring hub 701 can send raw data measurements to platform 731, and can receive models and learning materials from platform 731.

With reference to FIG. 7B, shown is a diagrammatic representation of another example of a monitoring hub. In this example, monitoring hub 735 can be a mobile device, such as a smart phone, tablet, etc. Monitoring hub 735 can provide data pre-processing, content cache, and/or infant status assessment. The monitoring hub 735 can also include learning content and schedule(s). In addition, the monitoring hub 735 can provide digital signal processing, a human interface, and data security. Furthermore, model-based content adaptation can be provided at the monitoring hub 735. Accordingly, models obtained from the platform 757 can be tailored for the infants developmental age and needs. Specifically, development models can be evaluated at the monitoring hub 735 and content from the library can be selected and customized. One example of content adaptation as applied to interactive activities includes selecting a sequence of interactive activities that is developmentally appropriate and doesn't exhaust the infant. In particular, a determination can be made about a particular infant's developmental age and the duration of an interaction window appropriate for this age. Using this information, content from the content library stored at the platform 757 can be selected and adapted to be appropriate for the infant. This adapted content can then be presented to the infant during an appropriate interaction window.

In the present example, the monitoring hub 735 includes a processor 737, memory 739, persistent storage 741, display 743, device interface(s) 751, infant monitoring device interface 745, USB/Micro USB port 747, and platform interface 749. Although particular components are shown, it should be recognized that some of these components can be omitted without deviating from the scope of this disclosure. Additional components can also be included depending on the desired operation of the monitoring hub 735 and the infant monitoring system.

In the present embodiment, processor 737 and memory 739 can be used to process data measurements received from infant monitoring device 753. Specifically, this data can be processed to develop observations and/or inferences as described above with regard to FIG. 3. In addition, processor 737 and memory 739 can be used to customize content for the infant such as learning materials to be age appropriate. Persistent storage 741 can store content and schedule(s), as well as any models, charts, etc. received from the platform 757. Furthermore, persistent storage 757 can store information specific to the infant.

In the present example, display 743 allows a caregiver to view and or interact with the monitoring hub 735. For instance, the caregiver can view observations or inferences made about the infant, view a video feed, listen to audio from the infant's room, and input data through the display 743. In addition, notifications, alerts, suggestions, etc. can be displayed for the caregiver through the display 743.

In the present embodiment, device interface(s) 751 facilitates the operation of peripheral devices with the infant monitoring system. For instance, ambient sensing, such as local sensing of environment, vibration sensing, audio sensing, and visual monitoring may be desirable. As such, various external devices 759 can be included as part of the infant monitoring system. In particular, camera 761 can be used to transmit video for a caregiver to see on a monitor, such as through display 743. Camera 761 can also be used to gather data measurements associated with the infant such as position. Audio sensor 765 can be used to transmit audio for a caregiver to hear, such as through speakers included in the mobile device. Audio sensor 765 can also be used to gather data measurements associated with the infant's surroundings and environment. In addition, the audio sensor 765 can be used to gather data measurements about sounds from the infant, such as cries, verbal articulation, etc. In some examples, a projector 763 can be included as part of the monitoring hub 735. Projector 763 can be used to display lights or images for the infant to see. This feature can be useful to augment the environment with soothing lights, colors, or images. In some examples, this may be used to present as learning content to the infant. According to various embodiments, the external devices 759 communicate wirelessly with monitoring hub 735 through the device interface(s) 751. Because the devices are physically separate from the monitoring hub 735, these devices can be conveniently positioned relative to the infant.

In the present embodiment, a tablet device 759 (or other mobile device) can communicate with monitoring hub 735 through device interface(s) 751. The tablet device 759 can serve as an accessory in the delivery of structured learning-focused interactions to the caregiver for use with the infant. In some examples, the tablet can have additional sensors useful in assessing babies' growth parameters. For instance, tablet device 759 can be used to monitor audio or video from the infant's environment, especially when the tablet device 759 is located near the infant and the mobile device is located near the caregiver. According to various embodiments, the infant is not expected to interact with the tablet device 759 during the first 24 months.

In the present embodiment, monitoring hub 735 includes numerous interfaces. For instance, infant monitoring device interface 745 facilitates wireless communication with the infant monitoring device 753. USB/Micro USB Port 747 can be used as a plug-in for charging base 755, such as the one shown in FIG. 5C. The charging base 755 can be induction-based, such that the infant monitoring device 753 can be placed in contact with the charging base 755 during charging. In the present example, a platform interface 749 is used to communicate with platform 757. As described above with regard to various examples, the monitoring hub 735 can send data to and receive information from platform 757. For instance, monitoring hub 735 can send raw data measurements to platform 757, and can receive models and learning materials from platform 757.

In the present example, the monitoring hub 735 can be an IOS, Android, or similar device. BLE is a communication stack that can be used to exchange data and upgrade firmware. In the present embodiment, the API includes access to raw data from the sensors in debug mode. A storage API can be provided for the sensors, allowing data to be downloaded and processed by the mobile device on demand.

According to various embodiments, if a mobile device is used as a monitoring hub 735, then the infant monitoring system can be portable. As such, the monitoring system can be used outdoors, at remote locations outside of the home, etc. With this system, continuous monitoring can remain uninterrupted when the infant is taken outside or to another location. The infant monitoring device 753 can continue to transmit data to the mobile device in these embodiments. If there are other peripheral devices used for monitoring at home, such as a camera 761, audio sensor 765, or the like, that would be cumbersome or inconvenient to use while outdoors or traveling, these devices can be inactive during these outings. For instance, the monitoring system can be placed in a remote monitoring mode so that the peripheral devices, such as external devices 759 and tablet device 759, can be in a sleep mode or an energy saving mode and not transmit information during the outing.

An infant monitoring system, as described in various embodiments herein, can be used can be used in many different ways. For instance, the infant monitoring system can be used to assess an infant's development and health, present learning materials, provide suggestions to a caregiver associated with the infant, or the like. Examples of some processes that can be implemented with the infant monitoring system are described below with regard to FIGS. 8-13. In some instances, the processes can be carried out using computer code and computer readable media.

Figure 8:
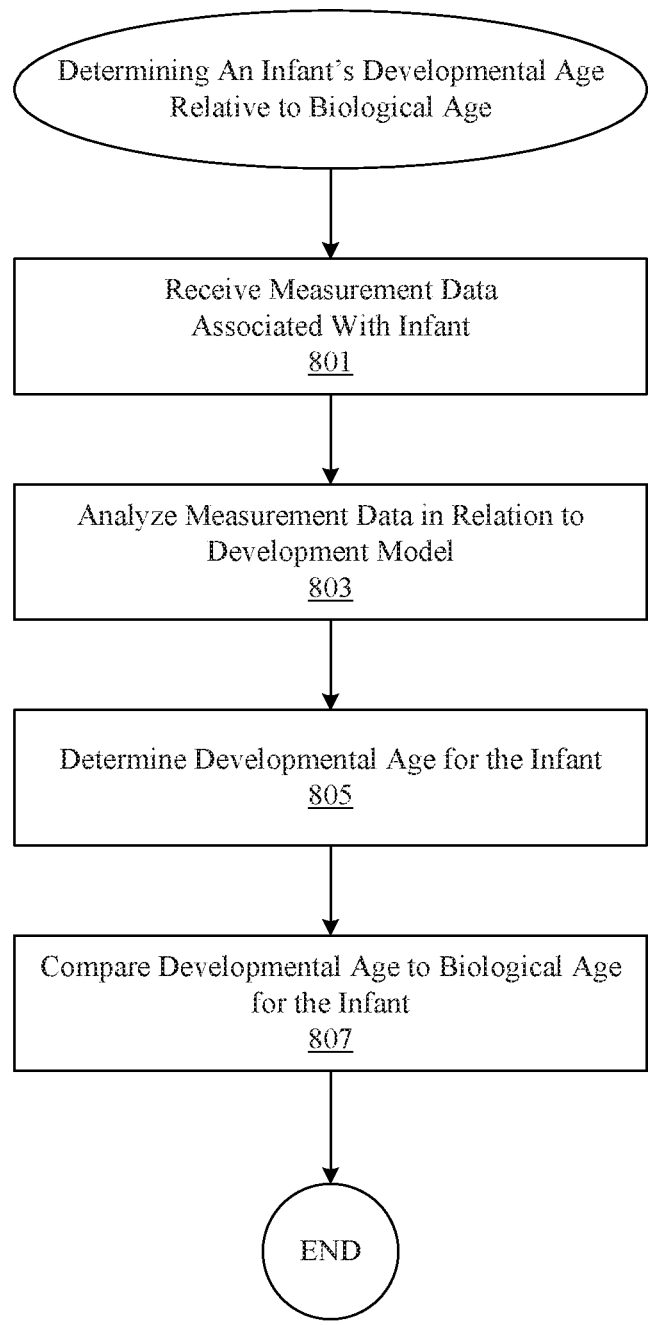
FIG. 8 is a flow diagram of one example of a process for determining an infants developmental age relative to the infants biological age.

With reference to FIG. 8, shown is a flow diagram of one example of a process for determining an infant's developmental age relative to the infant's biological age. In this example, measurement data associated with an infant is received at 801. In particular, the measurement data is received at a monitoring hub from sensors associated with an infant monitoring device. As described above with regard to various examples, measurement data can include aspects such as infant position and movement, motion, temperature, position, and galvanic skin response. Other metrics can also be used depending on the application.

In the present example, the measurement data is then analyzed in relation to a development model obtained from a remote platform at 803. According to various embodiments, the remote platform is configured to receive information from numerous monitoring hubs associated with their respective infant monitoring devices and the development model is based on an aggregation of the information received from the numerous monitoring hubs. Specifically, the development model is built using machine learning that identifies patterns and characteristics of the information received from the numerous monitoring hubs, according to various examples. The development model may be built at the platform and updated as new information is received. In particular examples, the development model can include measurement data, observations, inferences, or other metrics that correspond to infants at various ages.

In some instances, the development model includes a set of model measurement data corresponding to infants at different ages. This model measurement data is an aggregation of the information received from the numerous monitoring hubs associated with infants at different ages. More particularly, for each developmental age, there is a set of model measurement data, and any other desired metrics, that are selected based on an aggregation of the information from the numerous monitoring hubs. The model measurement data can be based on an average of measurement data associated with the numerous monitoring hubs in some examples. In addition, outlier data, such as data that falls far away from the other data may be discarded in some instances to account for errors or data that would otherwise inaccurately skew the model measurement data. According to various embodiments, the development model is updated when additional information is received from the numerous monitoring hubs or periodically to incorporate new information received from the numerous monitoring hubs.

In other instances, analyzing the measurement data may include processing the measurement data into an observation about the infant and comparing the observation to the development model, where the observation includes one of sleep, mobility, stress, position, comfort, health, vigilance, or articulation. In such instances, the development model includes model observations associated with infants at different ages. These model observations are based on an aggregation of the information received from the numerous monitoring hubs associated with infants at different ages. More particularly, for each developmental age, there is a set of model observations, measurement data, and any other desired metrics that are selected based on an aggregation of the information from the numerous monitoring hubs. The model observations can be based on an average of observations associated with the numerous monitoring hubs in some examples. In addition, outlier data, such as data that falls far away from the other data may be discarded in some instances to account for errors or data that would otherwise inaccurately skew the model observations. According to various embodiments, the development model is updated when additional information is received from the numerous monitoring hubs or periodically to incorporate new information received from the numerous monitoring hubs.

In yet other instances, analyzing the measurement data may include processing the measurement data into an inference about the infant and comparing the inference to the development model, where the inference includes one of receptivity to learning, infant well-being, presence of caregiver, environmental factors, safety of infant, or emotional state of infant. In such instances, the development model includes model inferences associated with infants at different ages. These model inferences are based on an aggregation of the information received from the numerous monitoring hubs associated with infants at each of the different ages. More particularly, for each developmental age, there is a set of model inferences, measurement data, and any other desired metrics that are selected based on an aggregation of the information from the numerous monitoring hubs. The model inferences can be based on an average of inferences associated with the numerous monitoring hubs in some examples. In addition, outlier data, such as data that falls far away from the other data may be discarded in some instances to account for errors or data that would otherwise inaccurately skew the model inferences. According to various embodiments, the development model is updated when additional information is received from the numerous monitoring hubs or periodically to incorporate new information received from the numerous monitoring hubs.

In the present example, a developmental age for the infant is determined based on a comparison of the measurement data with the development model at 805. In particular, the measurement data, observations, inferences, or other metrics associated with the infant can be compared with model data included in the development model, according to various embodiments. Specifically, for various developmental ages, model measurement data is estimated for an average infant, based on the aggregation of information from the numerous monitoring hubs. The measurement data for the infant to be evaluated is then compared to the model measurement data associated with the development model. The developmental age associated with model measurement data that most closely matches the measurement data of the infant being evaluated is chosen to represent the infants developmental age. In some examples, the developmental ages in the development model may be discrete or may cover a continuum of ages, such as when the development model is built using interpolation of the data.

Next, in the present example, the developmental age is compared to a biological age of the infant at 807, where the biological age is obtained at the monitoring hub by manual input. In some instances, the biological age of the infant can be input by a parent, caregiver, or other user associated with the infant when the user initially uses the infant monitoring system, or at any time thereafter. This biological age can be stored for reference. Comparing the developmental age to the biological age of the infant can provide insights to the caregivers, parents, or other users associated with the infant about whether the infant is developing typically, ahead of expectations, or in a delayed manner. This information can be useful to determine whether further interventions or evaluations are recommended. For instance, if significant delays are found, a recommendation might be made to have the infant evaluated by a physician to determine if any medical conditions are present.

According to various embodiments, the process described in the present example can be implemented using various mechanisms associated with an infant monitoring system. For instance, an infant monitoring device, as described in previous examples, can be used to obtain the measurement data for the infant. Additionally, a monitoring hub, as also described in previous examples, can be used to perform various actions, such as receiving measurement data, analyzing the measurement data in relation to a development model, receiving manual input from a user, determining a developmental age for the infant based on a comparison of the measurement data with the development model, and providing a comparison of the developmental age with a biological age of the infant. In particular embodiments, the development model is developed at a remote platform that is configured to receive information from the numerous monitoring hubs and their corresponding infant monitoring devices. In some examples, various actions can be performed at the remote platform, such as receiving measurement data, analyzing the measurement data in relation to a development model, receiving manual input from a user, determining a developmental age for the infant based on a comparison of the measurement data with the development model, and providing a comparison of the developmental age with a biological age of the infant. In such examples, a user may be able to input data and view data and results through a portal provided by the remote platform.

Figure 9A:
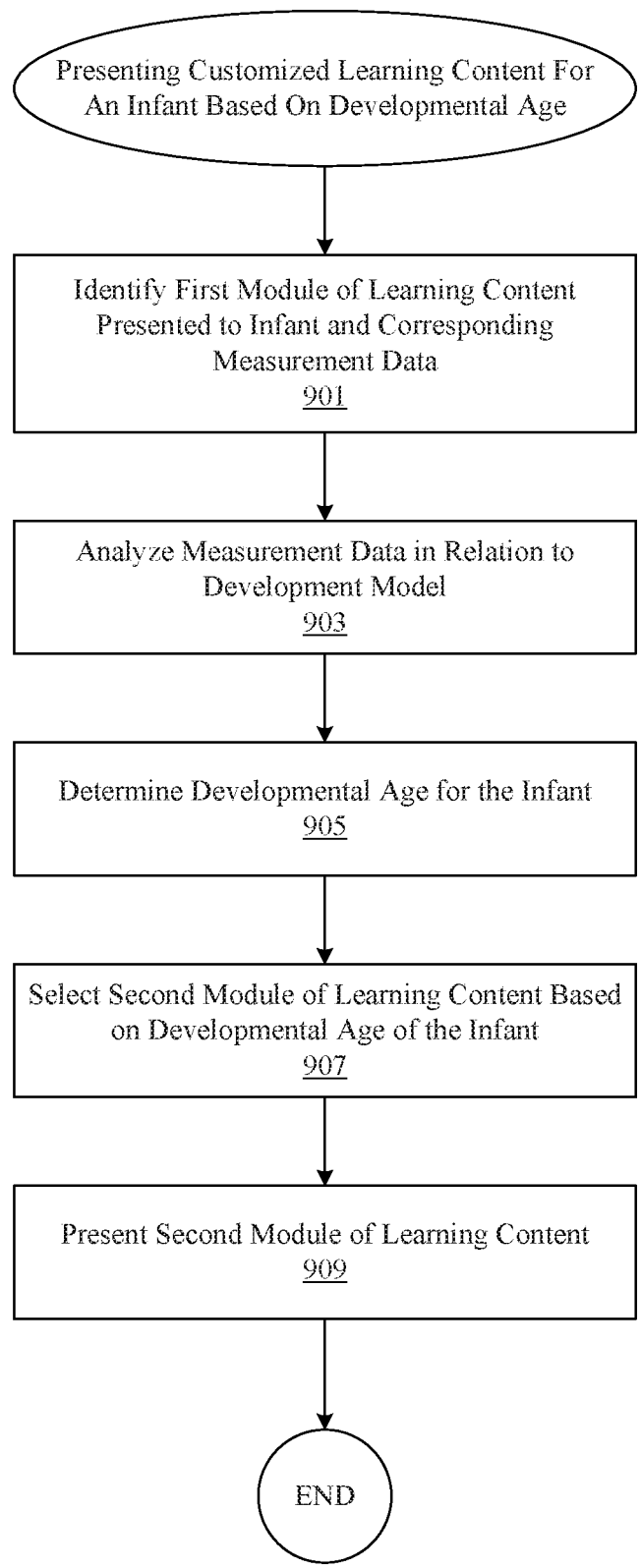
FIG. 9A is a flow diagram of one example of a process for presenting customized leaning content for an infant based on the infant's developmental age.

With reference to FIG. 9A, shown is a flow diagram of one example of a process for presenting customized learning content for an infant based on the infant's developmental age. In this example, a first module of learning content previously presented to an infant, along with corresponding measurement data for the infant, is identified at 901. Specifically, the measurement data corresponds to data obtained during presentation of the first module of learning content. As described above with regard to various examples, measurement data can be obtained from sensors associated with an infant monitoring device and include items such as infant gaze intensity and duration, infant position and movement, motion, temperature, position, and galvanic skin response. Other metrics can also be used depending on the application. The first module of learning content can include any of various types of learning content. For instance, learning content can include a lesson related to a particular subject. Some examples of subjects include language, sounds, words, numbers, colors, motor skills, and cognitive skills. As referred to in the present example, a module of learning content is a discrete amount of learning content that is intended to be presented in one session.

Next, in the present example, the measurement data is analyzed in relation to a development model obtained from a remote platform to determine whether the first module of learning content was appropriate for the infant at 903. As described in previous examples, the remote platform is configured to receive information from numerous monitoring hubs associated with corresponding infant monitoring devices. The development model is built at the remote platform from an aggregation of this information from the numerous monitoring hubs. The development model can include metrics such as measurement data, observations, and inferences corresponding to infant responses to the first module of learning content or similar learning content.

In some instances, analyzing the measurement data includes processing the measurement data into an observation about the infant and comparing the observation to the development model to determine if the first module of learning content was inappropriate for the infant. As described in various examples above, an observation can include aspects such as sleep, mobility, stress, position, comfort, health, vigilance, and/or articulation. Accordingly, the first module of learning content is deemed inappropriate for the infant if an undesirable level of stress is detected. Similarly, the first module of learning content is deemed inappropriate for the infant if an undesirable level of any other observation is detected. Conversely, the first module of learning content may be deemed appropriate for the infant if healthy levels of observations are detected.

In other instances, analyzing the measurement data includes processing the measurement data into an inference about the infant and comparing the inference to the development model to determine if the first module of learning content was inappropriate for the infant. As described in various examples above, an inference can include aspects such as receptivity to learning, infant well-being, presence of caregiver, environmental factors, safety of infant, and/or emotional state of infant. Accordingly, the first module of learning content is deemed inappropriate for the infant if an undesirable emotional state of the infant is detected. Similarly, the first module of learning content is deemed inappropriate for the infant if an undesirable level of any other inference is detected. Conversely, the first module of learning content may be deemed appropriate for the infant if healthy levels of inferences are detected.

In the present example, a developmental age is then determined for the infant based on whether the first module of learning content was appropriate for the infant as reflected by an analysis of the measurement data at 905. As described previously, the development model can include metrics such as measurement data, observations, and inferences corresponding to infant responses to the first module of learning content or similar learning content at various developmental ages. Based on a comparison of the measurement data or other metrics to the development model, a developmental age for the infant can be determined. In addition, comparing the measurement data or other metrics to the development model can also indicate if the first module of content was too difficult or challenging for the infant based on stress, discomfort, etc. If the content was too difficult, then future modules of learning content can be adjusted accordingly.

In the present example, a second module of learning content based on the developmental age of the infant is then selected at 907 and presented at 909. In some instances, the second module of learning content is selected based on whether the first module of learning content was appropriate or inappropriate for the infant as reflected by the analysis in 903. In particular, if an appropriate level of stress was detected for the infant during presentation of the first module of learning content, then the second module of learning content is selected to be at the same level as or more difficult than the first set of learning content. Similarly, if an appropriate level of comfort was detected for the infant during presentation of the first module of learning content, then the second module of learning content is selected to be at the same level as or more difficult than the first module of learning content. In another example, the second module of learning content is selected to be at the same level as or more difficult than the first module of learning content if an appropriate level of receptivity to learning was detected for the infant during presentation of the first module of learning content. Similarly, if appropriate levels of the measurement data, observations, inferences, or other metrics were found during presentation of the first module of learning content, then the same level or more difficult material can be selected for the second module of learning content. Conversely, if inappropriate levels of the measurement data, observations, inferences, or other metrics were found during presentation of the first module of learning content, then less difficult material can be selected for the second module of learning content. According to various embodiments, the second module of learning content can include material that is related or unrelated to the first module of learning content. In some examples, the second module of learning content includes informational material or suggestions for a caregiver associated with the infant.

According to various embodiments, the process described in the present example can be implemented using various mechanisms associated with an infant monitoring system. For instance, an infant monitoring device, as described in previous examples, can be used to obtain measurement data when the infant is presented with a first module of learning content. Additionally, a monitoring hub, as also described in previous examples, can be used to perform various actions, such as receiving the measurement data, analyzing the measurement data in relation to a development model obtained from a remote platform to determine whether the first module of learning content was appropriate for the infant, determining a developmental age for the infant based on the whether the first module of learning content was appropriate for the infant as reflected by an analysis of the measurement data, and presenting a second module of learning content customized to the developmental age of the infant.

Figure 9B:
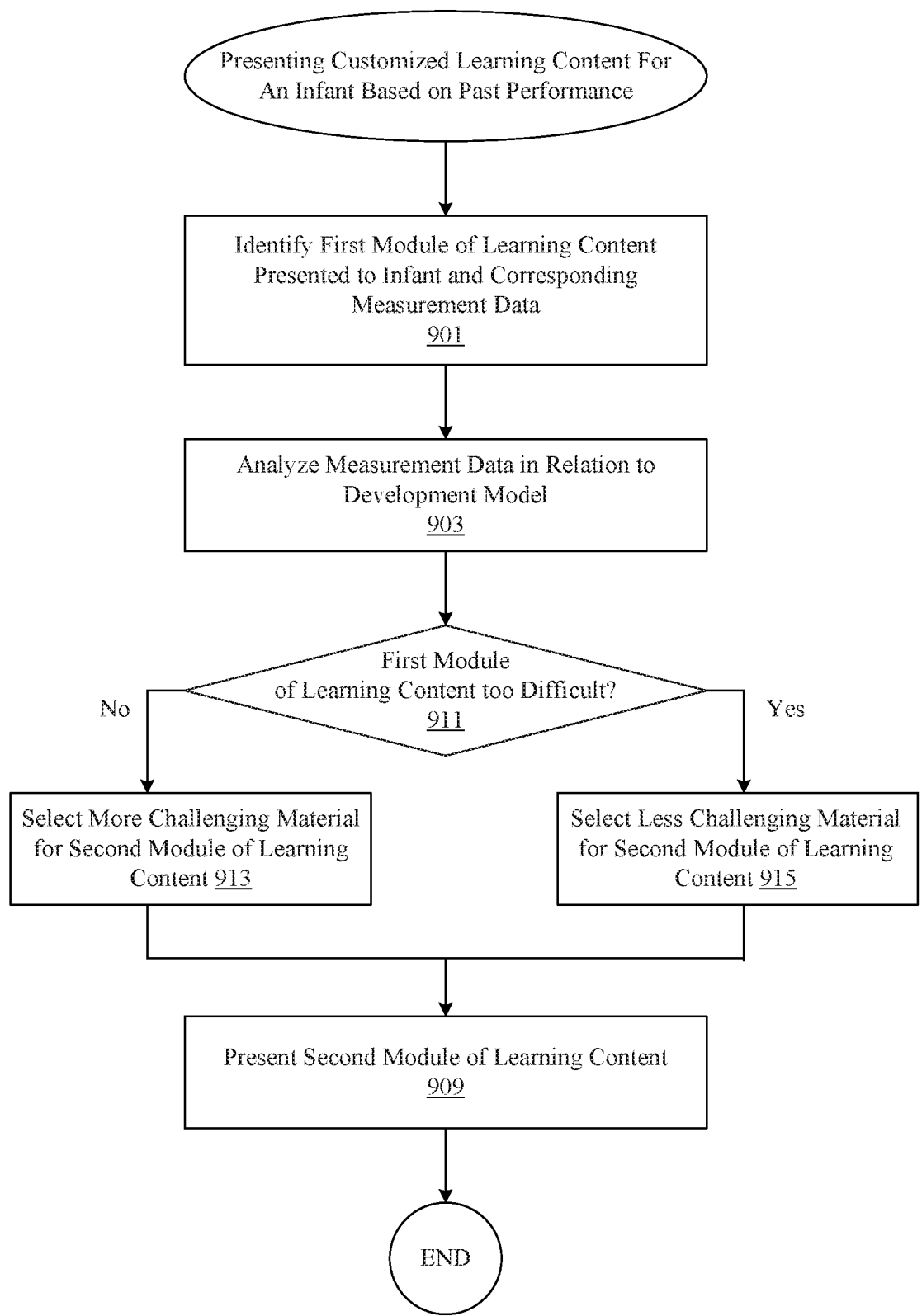
FIG. 9B is a flow diagram of one example of a process for presenting customized learning content for an infant based on the infant's past performance.

With reference to FIG. 9B, shown is a flow diagram of one example of a process for presenting customized learning content for an infant based on the infant's past performance. This process is similar to the process described with regard to FIG. 9A, but differs because customized learning content is selected based on the infant's response to previous learning content, without the need to assess the infant's developmental age. This process can be repeated such that each iteration further refines the selection of learning content to be more appropriate for the infant.

In this example, a first module of learning content previously presented to an infant, along with corresponding measurement data for the infant, is identified at 901. Specifically, the measurement data corresponds to data obtained during presentation of the first module of learning content. As described above with regard to various examples, measurement data can be obtained from sensors associated with an infant monitoring device and include items such as infant gaze intensity and duration, infant position and movement, motion, temperature, position, and galvanic skin response. Other metrics can also be used depending on the application. The first module of learning content can include any of various types of learning content. For instance, learning content can include a lesson related to a particular subject. Some examples of subjects include language, sounds, words, numbers, colors, motor skills, and cognitive skills. As referred to in the present example, a module of learning content is a discrete amount of learning content that is intended to be presented in one session.

Next, in the present example, the measurement data is analyzed in relation to a development model obtained from a remote platform to determine whether the first module of learning content was appropriate for the infant at 903. As described in previous examples, the remote platform is configured to receive information from numerous monitoring hubs associated with corresponding infant monitoring devices. The development model is built at the remote platform from an aggregation of this information from the numerous monitoring hubs. The development model can include metrics such as measurement data, observations, and inferences corresponding to infant responses to the first module of learning content or similar learning content.

In some instances, analyzing the measurement data includes processing the measurement data into an observation or inference about the infant and comparing the observation or inference to the development model to determine if the first module of learning content was appropriate for the infant. As described in various examples above, an observation can include aspects such as sleep, mobility, stress, position, comfort, health, vigilance, and/or articulation. As also described in various examples above, an inference can include aspects such as receptivity to learning, infant well-being, presence of caregiver, environmental factors, safety of infant, and/or emotional state of infant.

In the present example, a determination is then made about whether the first module of learning content was too difficult for the infant at 911. In particular, if an undesirable or unhealthy level is detected in the measurement data, observations, inferences, or other metrics, then a determination can be made that the learning content in the first module was too difficult. For instance, if an undesirable level of stress is detected, then the first module of learning content is deemed too difficult. Similarly, if an undesirable emotional state of the infant is detected, then the first module of learning content is deemed too difficult. In contrast, if healthy or desirable levels of the measurement data, observations, inferences, and/or other metrics are detected, then the first module of learning content is deemed not too difficult.

In the present example, if the first module of learning content was not too difficult for the infant, then more challenging material is selected for a second module of learning content at 913. However, if the first module of learning content was too difficult for the infant, then less challenging material is selected for a second module of learning content at 915. Depending on the system, the second module of learning content may be related or unrelated to the first module of learning content. For instance, the first module and second module may include lessons from the same subject or may include lessons from different subjects altogether. Once the second module of learning content is selected, it is presented for the infant at 909.

Figure 10:
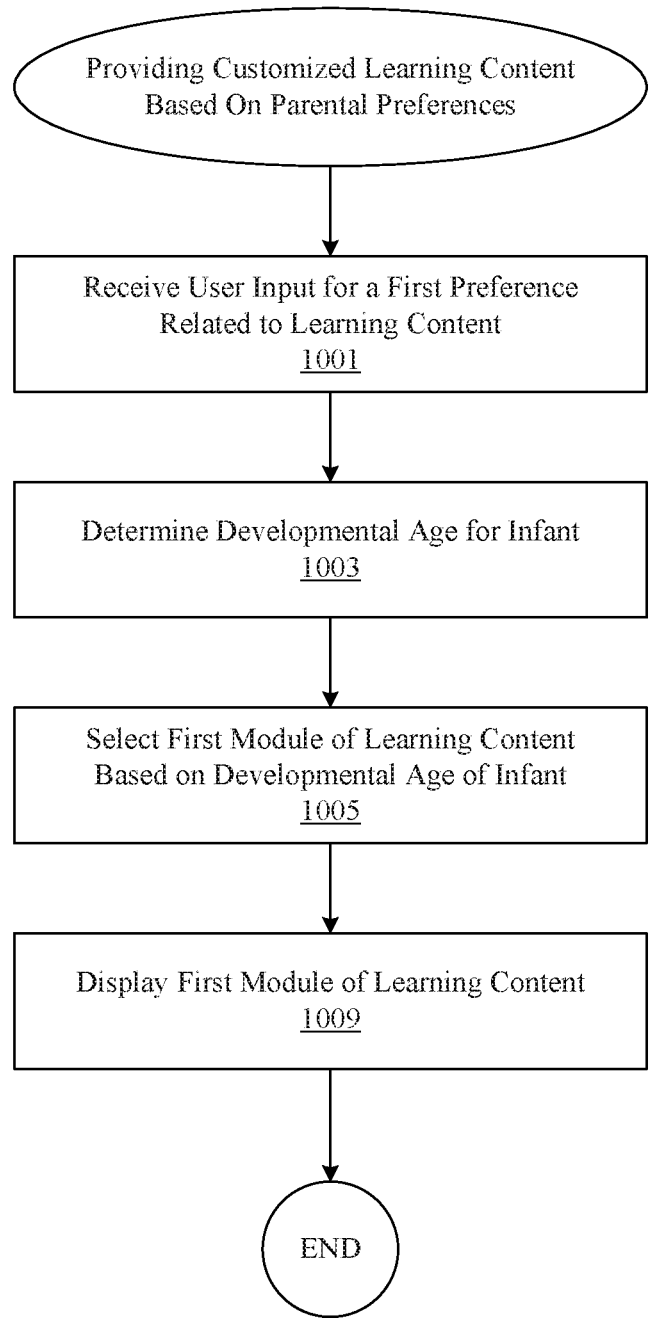
FIG. 10 is a flow diagram of one example of a process for providing customized leaning content based on parental preferences.

With reference to FIG. 10, shown is a flow diagram of one example of a process for providing customized learning content based on parental preferences. More particularly, the customized learning content can be selected based on preferences input by a user associated with the infant, such as a parent, caregiver, etc. In the present example, user input for a first preference related to learning content for an infant is received at 1001. This input can be received at a monitoring hub associated with the infant, such as through a keyboard, touch screen, etc. associated with the monitoring hub. Numerous preferences can be made available to the user for selection as the first preference. For instance, a preference can include a subject such as sounds, words, numbers, or colors. In another instance, a preference can include physical activities for the infant, such as physical activities relating to motor skills or cognitive skills. In some examples, a preference can include a preferred language for the infant. In some examples, additional preferences can also be selected by a user. Specifically, a second preference can be selected and customized learning content can be chosen based on both the first and second preferences. Any number of additional preferences can be selected, depending on the application.

Next, at 1003, a developmental age is determined for the infant based on measurement data received from an infant monitoring device. As described in various examples, the infant monitoring device includes sensors configured to collect the measurement data that is then sent to the monitoring hub for analysis. As also described in various examples, the measurement data can include metrics such as infant position, movement, motion, temperature, position, and galvanic skin response. Other metrics can also be used depending on the application.

In particular embodiments, determining a developmental age for the infant includes analyzing the measurement data in relation to a development model obtained from a remote platform. As described above in various examples, the remote platform receives information from numerous monitoring hubs associated with numerous infant monitoring devices. According to various examples, the development model includes a set of model measurement data corresponding to infants at different ages, where the set of model measurement data is based on an aggregation of the information received from the numerous monitoring hubs associated with infants at different ages. In some examples, the model measurement data is based on an average of the information received from the numerous monitoring hubs associated with infants at different ages. In addition, outliers in the information may be discarded if it skews the model inappropriately. In the present example, determining a developmental age for the infant is based on a comparison of the measurement data associated with the infant with model measurement data representing infants at different ages. In particular, model measurement data most closely matching the measurement data for the infant is used to estimate the infants developmental age. Specifically, the developmental age associated with the model measurement data most closely matching the measurement data for the infant is selected as an estimate for the infant's developmental age.

According to various embodiments, the development model includes model observations associated with infants at different ages. As with the model measurement data, the model observations are based on an aggregation of the information received from the numerous monitoring hubs associated with infants at different ages. Furthermore, analyzing the measurement data includes processing the measurement data into an observation about the infant and comparing the observation to the development model. Examples of observations include sleep, mobility, stress, position, comfort, health, vigilance, and articulation. Model observations most closely matching the observations for the infant are used to estimate the infant's developmental age. Specifically, the developmental age associated with the model observation(s) most closely matching the observation(s) for the infant is selected as an estimate for the infant's developmental age.

In some embodiments, the development model includes model inferences associated with infants at different ages. As with the model measurement data, the model inferences are based on an aggregation of the information received from the numerous monitoring hubs associated with infants at different ages. Furthermore, analyzing the measurement data includes processing the measurement data into an inference about the infant and comparing the inference to the development model. Examples of inferences include receptivity to learning, infant well-being, presence of caregiver, environmental factors, safety of infant, and emotional state of infant. Model inferences most closely matching the inferences for the infant are used to estimate the infant's developmental age. Specifically, the developmental age associated with the model inference(s) most closely matching the inference(s) for the infant is selected as an estimate for the infant's developmental age.

In the present example, a first module of learning content is selected at 1005 based on a developmental age associated with the infant and the first preference, as input by the user. As mentioned previously, if additional preferences have been selected by the user associated with the infant, these preferences are also taken into account when selecting the first module of learning content. The learning content can be stored at the monitoring hub or at the remote platform, depending on the application. Once the first module of learning content is selected, it is displayed at the monitoring hub at 1009.

According to various embodiments, the process described in the present example can be implemented using various mechanisms associated with an infant monitoring system. For instance, an infant monitoring device, as described in previous examples, can be used to obtain measurement data using sensors. Additionally, a monitoring hub, as also described in previous examples, can be used to perform various actions, such as receive the measurement data from the plurality of sensors, analyze the measurement data to determine a developmental age for the infant, receive user input for a first preference related to learning content for an infant, and select a first module of learning content based on a developmental age associated with the infant and the first preference. The monitoring hub can also include a display configured to present the first module of learning content.

Figure 11:
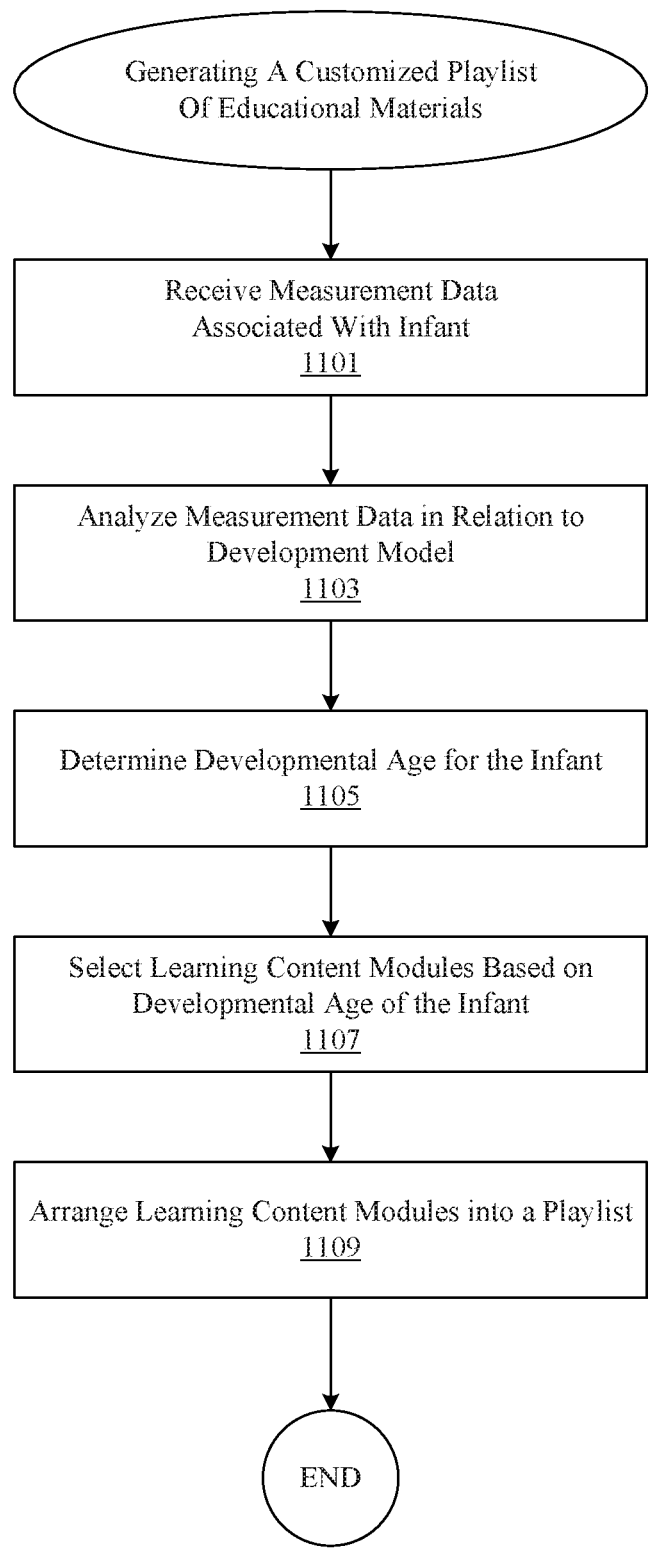
FIG. 11 is a flow diagram of one example of a process for generating a customized playlist of educational materials.

With reference to FIG. 11, shown is a flow diagram of one example of a process for generating a customized playlist of educational materials. In this example, measurement data for an infant is first received at a monitoring hub from sensors associated with an infant monitoring device at 1101. As described in various examples above, the measurement data can include metrics such as motion, temperature, position, and galvanic skin response. Other metrics can also be used, depending on the application.

In the present example, the measurement data is then analyzed in relation to a development model obtained from a remote platform at 1103. As described above in various examples, the remote platform receives information from numerous monitoring hubs and their corresponding infant monitoring devices. The development model is built from an aggregation of the information received from the numerous monitoring hubs. According to various examples, the development model includes a set of model measurement data corresponding to infants at different ages, where the set of model measurement data is based on an aggregation of the information received from the numerous monitoring hubs associated with infants of different ages. In some examples, the model measurement data is based on an average of the information received from the numerous monitoring hubs associated with infants of different ages. In addition, outliers in the information may be discarded if it skews the model inappropriately.

In some examples, the development model includes model observations associated with infants at different ages. As with the model measurement data, the model observations are based on an aggregation of the information received from the numerous monitoring hubs associated with infants at different ages. Furthermore, analyzing the measurement data includes processing the measurement data into an observation about the infant and comparing the observation to the development model. Examples of observations include sleep, mobility, stress, position, comfort, health, vigilance, and articulation.

In particular examples, the development model includes model inferences associated with infants at different ages. As with the model measurement data, the model inferences are based on an aggregation of the information received from the numerous monitoring hubs associated with infants of different ages. Furthermore, analyzing the measurement data includes processing the measurement data into an inference about the infant and comparing the inference to the development model. Examples of inferences include receptivity to learning, infant well-being, presence of caregiver, environmental factors, safety of infant, and emotional state of infant.

Next, a developmental age is determined for the infant based on a comparison of the measurement data with the development model at 1105. In the present example, determining a developmental age for the infant is based on a comparison of the measurement data associated with the infant with model measurement data representing infants at different ages. In particular, model measurement data from the development model that most closely matches the measurement data for the infant is used to estimate the infant's developmental age. Specifically, the developmental age associated with the model measurement data most closely matching the measurement data for the infant is selected as an estimate for the infant's developmental age.

In some examples, an observation derived from the measurement data for the infant can be used to determine the infant's developmental age. In particular, model observations most closely matching the observations for the infant are used to estimate the infant's developmental age. More specifically, the developmental age associated with the model observation(s) most closely matching the observation(s) for the infant is selected as an estimate for the infant's developmental age.

In some examples, an inference derived from the measurement data for the infant can be used to determine the infant's developmental age. In particular, model inferences most closely matching the inferences for the infant are used to estimate the infant's developmental age. More specifically, the developmental age associated with the model inference(s) most closely matching the inference(s) for the infant is selected as an estimate for the infant's developmental age.

In the present example, once the infant's developmental age is determined, numerous learning content modules appropriate to the developmental age of the infant are selected at 1107. According to various embodiments, the learning content modules are obtained from the remote platform. The learning content modules can include any of various types of learning content. For instance, learning content can include a lesson related to a particular subject. Some examples of subjects include language, sounds, words, numbers, colors, motor skills, and cognitive skills. As referred to in the present example, a learning content module is a discrete amount of learning content that is intended to be presented in one session.

Once the learning content modules are selected, they are arranged into a playlist at 1109. In some examples, a selected learning content module from the playlist is played when the infant is receptive to learning. As described in previous examples, measurement data can be used to determine when an infant is receptive to learning. Once this is determined, then learning content can be selected from the playlist to be presented. In some examples, the playlist can be paused at a first location and then restarted from the first location, as desired by the user. In particular embodiments, once a selection from the playlist begins, the playlist plays continuously until a user selects a command to pause or stop play of the playlist. However, in other embodiments, the playlist plays continuously until a determination is made that the infant is not sufficiently receptive to learning. Such a determination can be made based on an analysis of subsequent measurement data obtained during presentation of the playlist in relation to a learning receptivity model obtained from the remote platform. In yet other examples, a user can access the playlist and play learning content modules at will.

According to various embodiments, the process described in the present example can be implemented using various mechanisms associated with an infant monitoring system. For instance, an infant monitoring device, along with its associated sensors, can be used to obtain measurement data associated with the infant, as described in previous examples. Additionally, a monitoring hub, as also described in previous examples, can be used to perform various actions, such as receive measurement data from the sensors associated with an infant monitoring device, analyze the measurement data in relation to a development model obtained from a remote platform, determine a developmental age for the infant based on a comparison of the measurement data with the development model, obtain learning content modules from a remote platform, select and arrange numerous learning content modules appropriate to the developmental age of the infant into a playlist, and play learning content modules from the playlist. The monitoring hub can also receive input from a user to play, pause, or otherwise navigate through the playlist. Furthermore, in some examples, the monitoring hub can determine when an infant is receptive to learning, so that the monitoring hub can play a selection from the playlist during these times.

Figure 12:
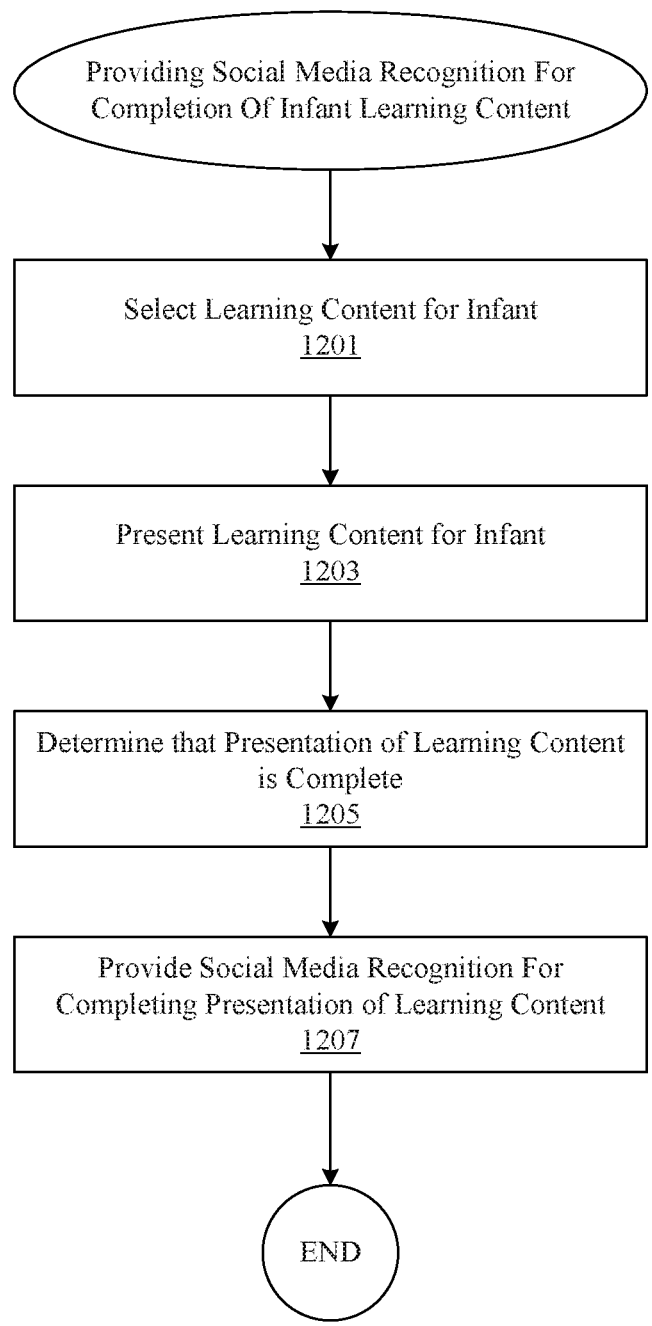
FIG. 12 is a flow diagram of one example of a process for providing social media recognition for completion of infant learning content.

With reference to FIG. 12, shown is a flow diagram of one example of a process for providing social media recognition for completion of infant learning content. In this example, learning content appropriate for an infant is selected at 1201 based on a developmental age associated with the infant. According to various embodiments, the developmental age of the infant is determined by analyzing measurement data received from an infant monitoring device in relation to a development model obtained from a remote platform. As described above with regard to various examples, the measurement data can include metrics such as motion, temperature, position, and/or galvanic skin response. Other metrics can also be used, depending on the application. In addition, as described in various examples above, the development model can be based on an aggregation of information received from numerous infant monitoring hubs. Furthermore, the development model can include model measurement data representing infants of different developmental ages.

In some examples, analyzing the measurement data in relation to a development model includes processing the data measurement into an observation about the infant and comparing the observation to the development model. The observation can include aspects such as sleep, mobility, stress, position, comfort, health, vigilance, and/or articulation. In these examples, the development model can include model observations representing infants of different developmental ages.

In some examples, analyzing the measurement data in relation to a development model includes processing the data measurement into an inference about the infant and comparing the inference to the development model. The inference can include aspects such as receptivity to learning, infant well-being, presence of caregiver, environmental factors, safety of infant, and/or emotional state of infant. In these examples, the development model can include model inferences representing infants of different developmental ages.

Once a developmental age is selected based on a comparison of the measurement data for the infant to the development model, appropriate learning content is selected for the infant. The learning content can be chosen from a variety of materials. For instance, the learning content can include a lesson relating to a particular subject Some examples of subjects include sounds, language, numbers, colors, and/or physical activities. In some examples, the learning content is selected based on previous learning content presented to the infant. In other examples, the learning content includes informational material or suggestions for a caregiver associated with the infant Once the learning content is selected, it is presented at 1203 through a monitoring hub associated with the infant.

According to various embodiments, after the learning content has been presented, a determination is made that presentation of the learning content has been completed at 1205. In the present example, determining that presentation of the learning content has been completed includes detecting that the learning content has played to completion. Accordingly, if the learning content is interrupted during play, such as by stopping or pausing the learning content, a determination of completion will not be made.

After a determination has been made that the learning content has been completed, social media recognition is provided for completing the presentation of the learning content at 1207. In some examples, the social media recognition is posted to a social media feed associated with a caregiver, parent, or guardian of the infant. Specifically, the monitoring hub associated with the infant can provide a post or an option to post this social media recognition. Alternatively, the remote platform can provide the post or option to post in some embodiments. In the present example, the social media recognition includes information about the learning content completed. Specifically, the social media recognition may include a level of accomplishment associated with the learning content completed. For instance, different milestones or levels can be assigned to blocks of learning content. In other examples, each learning content module is associated with an accomplishment itself. The social media recognition may also include information such as the subject included in the learning content completed. In one example, the social media recognition post may include a graphic along with a message. Similarly, various accomplishments and learning aspects can be posted to social media.

According to various embodiments, the process described in the present example can be implemented using various mechanisms associated with an infant monitoring system. For instance, an infant monitoring device, along with its associated sensors, can be used to obtain measurement data associated with the infant, as described in previous examples. Additionally, a monitoring hub, as also described in previous examples, can be used to perform various actions, such as receive measurement data from the sensors associated with the infant monitoring device, analyze the measurement data in relation to a development model obtained from a remote platform, determine a developmental age for the infant based on a comparison of the measurement data with the development model, present learning content appropriate to the developmental age of the infant, and provide social media recognition for completing presentation of the learning content.

Figure 13:
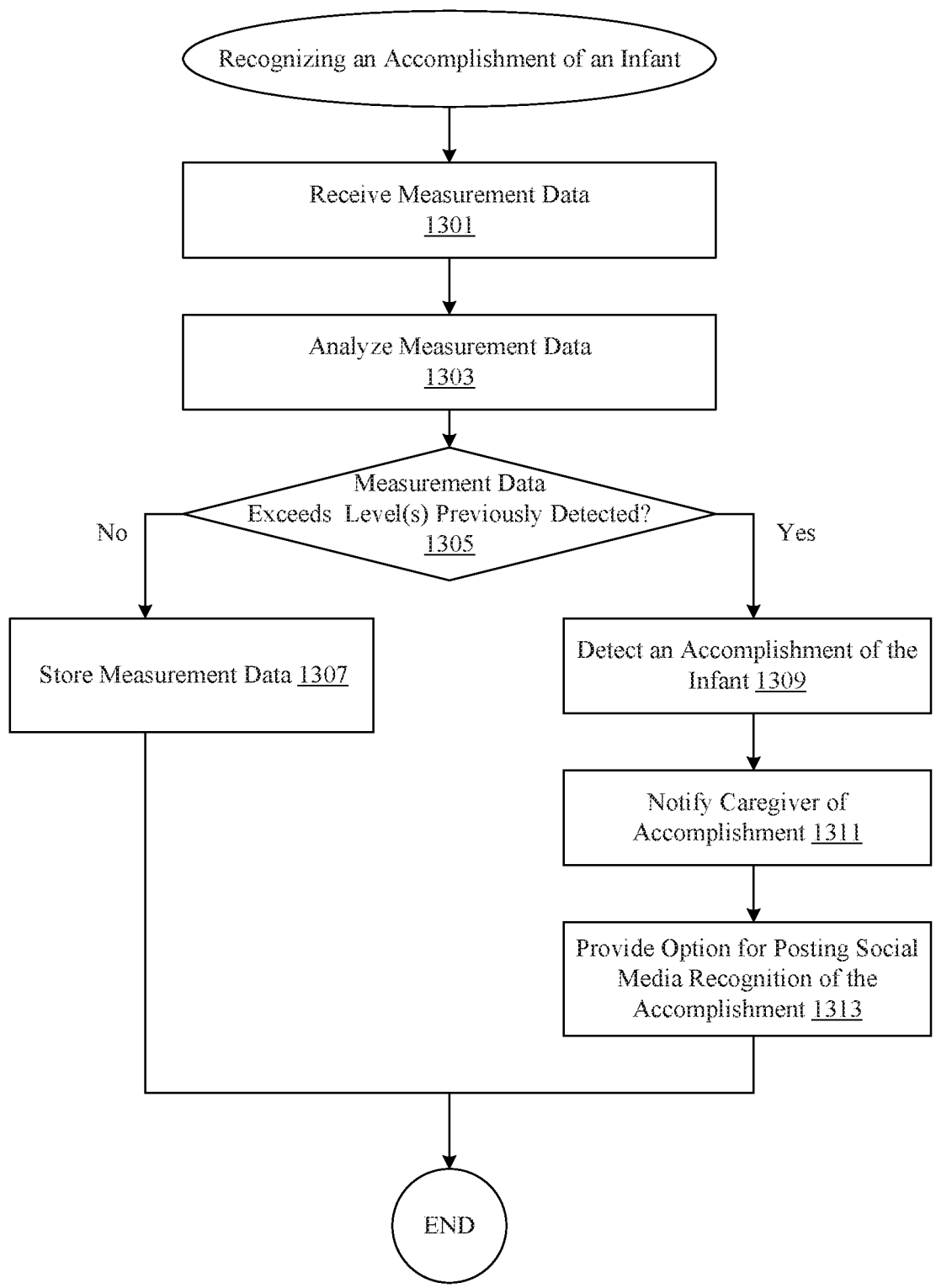
FIG. 13 is a flow diagram of one example of a process for detecting accomplishments of an infant.

With reference to FIG. 13, shown is a flow diagram of one example of a process for detecting accomplishments of an infant. In this example, measurement data for an infant is received from sensors associated with an infant monitoring device at 1301. As described with regard to various previous examples, the measurement data can include aspects such as motion, temperature, position, and/or galvanic skin response. Other metrics can also be used, depending on the application.

In the present example, the measurement data is then analyzed in relation to a set of past measurement data for the infant at 1303. The set of past measurement data includes previously collected measurement data and associated dates, and/or times, etc. corresponding to when the data was collected. According to various embodiments, the set of past measurement data is stored at a monitoring hub associated with the infant and the infant monitoring device. In some instances, analyzing the measurement data in relation to a set of past measurement data for the infant includes processing the measurement data into an observation about the infant and comparing the observation to a set of past observations for the infant. As described in various embodiments, an observation can include an aspect such as sleep, mobility, stress, position, comfort, health, vigilance, or articulation. In other instances, analyzing the measurement data in relation to a set of past measurement data for the infant comprises processing the measurement data into an inference about the infant and comparing the inference to a set of past inferences for the infant. As also described in various embodiments, an inference can include an aspect such as receptivity to learning, infant well-being, presence of caregiver, environmental factors, safety of infant, or emotional state of infant.

Based on a comparison of the measurement data with the set of past measurement data, a determination is then made whether the current measurement data exceeds level(s) previously detected at 1305, in the present example. For instance, if physical growth is detected, such as an increase in height/length, a determination is made that the measurement data exceeds previous growth levels. In another example, a type of movement, such as rolling over, may be detected when it had not been previously detected. In some instances, a determination that the measurement data exceeds previous level(s) may include determining that the measurement data exceeds previous level(s) by a certain amount. This amount can be programmed into the system, and can prevent detection of insignificant data or errors in measurement. For instance, a determination might be made only if growth is more than a predetermined amount (e.g. 3 mm). Similarly, other types of measurements, observations, inferences, or other metrics can be compared.

If the measurement data is consistent with the set of past measurement data, then the measurement data does not exceed levels previously detected, and no accomplishment is detected in the present example. In this scenario, the measurement data is then stored at 1307. This measurement data can be added to the set of past measurement data to be used in future analyses. Similarly, if observations, inferences, and/or other metrics are used and found to be consistent with past data, these observations, inferences, and/or other metrics can also be stored with the set of past measurement data.

However, if the measurement data exceeds levels previously detected in the set of past measurement data, then an accomplishment of the infant is detected at 1309 in the present example. Various types of accomplishments can be detected. For instance, an accomplishment can include physical growth or advancement of developmental age. Specifically, in the case of physical growth, the sensors can detect physical measurements in height or weight that constitute a growth accomplishment. For an advancement of developmental age, an accomplishment may be found if the infant demonstrates a physical, verbal, or otherwise developmental achievement as detected a comparison of the measurement data to a development model, as described in various examples herein. In some examples, an accomplishment includes reaching a milestone that had not been reached previously based on the set of past measurement data. Specifically, milestones can include events such as a first step, first word, linking words together into phrases or sentences, etc. In some embodiments, these milestones can be included in a development model. As described in various embodiments, the development model is based on an aggregation of the information received from numerous monitoring hubs associated with corresponding infant monitoring devices. Furthermore, the development model can be built at a remote platform that receives information from the numerous monitoring hubs and aggregates the information.

Once an accomplishment is detected in the present example, a notification is sent to a caregiver about the accomplishment at 1311. According to various embodiments, the caregiver can include a person associated with the infant, such as a parent, guardian, babysitter, nanny, relative, etc. The notification can be sent through the monitoring hub in some examples. A notification can also be sent through various other media, depending on the application. For instance, a notification can be sent by email or text by the monitoring hub.

According to various embodiments, an option to post social media recognition of the accomplishment can be provided at 1313. Specifically, the social media recognition may include a post to a social media feed associated with a user such as a caregiver, parent, or guardian of the infant. If the user opts to post to social media, the monitoring hub can provide the social media post, in some examples. Alternatively, the remote platform can provide the social media post in some examples. In the present embodiment, an option to post is offered to allow the caregiver, parent, or other person associated with the infant to filter posts, such as for privacy reasons. However, if privacy is not a concern, posts can also be generated automatically in some embodiments, without requiring the user to confirm the option to post the information. According to various embodiments, the social media recognition includes information about the accomplishment achieved. Specifically, the social media recognition may include a description, title, or message associated with the accomplishment. For instance, the social media recognition may include a message, such as "Congratulations Baby Emily for taking your first step today!" In some examples, the social media recognition post may include a graphic along with a message about the accomplishment.

According to various embodiments, the process described in the present example can be implemented using various mechanisms associated with an infant monitoring system. For instance, an infant monitoring device, along with its associated sensors, can be used to obtain measurement data associated with the infant, as described in previous examples. Additionally, a monitoring hub, as also described in previous examples, can be used to perform various actions, such as receive measurement data from the sensors, analyze the measurement data in relation to a set of past measurement data for the infant, store the set of past measurement data, detect an accomplishment of the infant based on a comparison of the measurement data with the set of past measurement data, and notify a caregiver associated with the infant about the accomplishment. In some examples, the monitoring hub is also configured to post and/or provide an option to post social media recognition of the accomplishment.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A system comprising:
   a camera for obtaining facial expression data of an infant;
   a wearable infant monitoring device, the wearable infant monitoring device including:
      a plurality of sensors configured to detect activity data of the infant, wherein the activity data includes motion and position of the infant, and a transmission interface configured to transmit the activity data; and a monitoring hub comprising a processor, wherein the monitoring hub is configured to:
  (a) receive the activity data from the transmission interface, and
  (b) analyze the activity data and the facial expression data in relation to a development model obtained from a remote platform, wherein the remote platform is configured to generate the development model from activity data received from the monitoring hub and a plurality of other monitoring hubs associated with a plurality of other infant monitoring devices, wherein the activity data and facial expression data is analyzed to generate a prediction of:
    a time and duration when the infant will be receptive to learning, and
    which learning content from a content library is suitable for the infant for the time and duration,
  (c) present the learning content to the infant, and
  (d) adjust a difficulty of subsequent learning content to be presented to the infant based on activity data obtained during presentation of the learning content.

2. The system of claim 1, wherein the facial expression data includes smile and gaze duration.

3. The system of claim 1, wherein the facial expression data includes smile and gaze intensity.

4. The system of claim 1, wherein the monitoring hub processes the activity data to customize learning content based on a developmental age associated with the infant.

5. The system of claim 1, wherein the monitoring hub further comprises persistent storage configured to store learning content and schedules.

6. The system of claim 1, wherein the monitoring hub further comprises persistent storage configured to store infant models and charts.

7. The system of claim 1, wherein the monitoring hub further comprises a platform interface configured to facilitate communication between the monitoring hub and the remote platform, wherein the remote platform aggregates activity data from the plurality of other infant monitoring devices.

8. The system of claim 1, further comprising a peripheral device.

9. The system of claim 8, wherein the peripheral device is a camera.

10. The system of claim 8, wherein the peripheral device is an audio sensor.

11. The system of claim 8, wherein the peripheral device is a projector.

12. The system of claim 8, wherein the peripheral device is a tablet device.

13. The system of claim 1, wherein the monitoring hub is a mobile device.

14. The system of claim 1, wherein the plurality of sensors includes a tri-axial accelerometer, galvanic skin response (GSR) detector, a gyroscope, and a temperature sensor.

15. The system of claim 1, wherein the transmission interface is a Bluetooth low energy (BLE) interface.

16. A device comprising:
  a device interface configured to receive facial expression data from a camera;
  an infant monitoring device interface configured to receive activity data wirelessly transmitted from an infant monitoring device corresponding to an infant, the infant monitoring device comprising a plurality of sensors configured to obtain the activity data, the activity data including motion and position of the infant; and
  a processor configured to:
    (a) analyze the activity data and the facial expression data in relation to a development model obtained from a remote platform, wherein the remote platform is configured to generate the development model from activity data received from the device and a plurality of monitoring hubs associated with a plurality of other infant monitoring devices, wherein the activity data is analyzed to generate a prediction of:
      a time and duration when the infant will be receptive to learning, and
      which learning content from a content library is suitable for the infant for the time and duration,
    (b) present the learning content to the infant, and
    (c) adjust a difficulty of subsequent learning content to be presented to the infant based on activity data obtained during presentation of the learning content.

17. The device of claim 16,
wherein the facial expression data includes smile and gaze duration.

18. The device of claim 16,
wherein the facial expression data includes smile and gaze intensity.

19. The device of claim 16, wherein the processor is further configured to processes the activity data to customize learning content based on a developmental age associated with the infant.

20. The device of claim 16, further comprising persistent storage configured to store learning content provided by the remote platform.

* * * * *